United States Patent
Natsumeda

(10) Patent No.: US 9,372,244 B2
(45) Date of Patent: Jun. 21, 2016

(54) MAGNETIC FORCE CHARACTERISTIC COMPUTING METHOD, MAGNETIC FORCE CHARACTERISTIC COMPUTING DEVICE AND COMPUTER PROGRAM

(75) Inventor: Mitsutoshi Natsumeda, Osaka (JP)

(73) Assignee: Hitachi Metals, Ltd., Tokyo (JP)

( * ) Notice: Subject to any disclaimer, the term of this patent is extended or adjusted under 35 U.S.C. 154(b) by 881 days.

(21) Appl. No.: 13/577,866

(22) PCT Filed: Feb. 8, 2011

(86) PCT No.: PCT/JP2011/052606
§ 371 (c)(1),
(2), (4) Date: Aug. 8, 2012

(87) PCT Pub. No.: WO2011/099471
PCT Pub. Date: Aug. 18, 2011

(65) Prior Publication Data
US 2012/0323504 A1 Dec. 20, 2012

(30) Foreign Application Priority Data
Feb. 10, 2010 (JP) .................. 2010-027963

(51) Int. Cl.
*G01R 33/02* (2006.01)
*G01N 1/04* (2006.01)
*G01R 33/00* (2006.01)
(Continued)

(52) U.S. Cl.
CPC ........ *G01R 33/1207* (2013.01); *G01R 33/0064* (2013.01); *G06F 17/5009* (2013.01); *G06F 2217/16* (2013.01); *G06F 2217/84* (2013.01);
(Continued)

(58) Field of Classification Search
CPC ........................................ G01R 11/00
USPC .............. 702/19, 51, 57, 63, 82, 94; 324/326; 428/328
See application file for complete search history.

(56) References Cited

U.S. PATENT DOCUMENTS 6,411,095 B1* 6/2002 Chin et al. .................... 324/326
2005/0151609 A1 7/2005 Natsumeda et al.
(Continued)

FOREIGN PATENT DOCUMENTS

| JP | 4228649 | 4/2004 |
|---|---|---|
| JP | 2004/257879 | 9/2004 |

(Continued)

OTHER PUBLICATIONS

Extended European Search Report for European Application No. 11742215.4 dated Feb. 8, 2016.

Primary Examiner — Gregory J Toatley
Assistant Examiner — Felix Suarez
(74) Attorney, Agent, or Firm — Muncy, Geissler, Olds & Lowe, P.C.

(57) ABSTRACT

A prestored database showing a correspondence of δ (depth)/ ΔHcJ (coercivity increment) and a prestored database showing a correspondence of Dy introduction amount/ΔHcJ are used to obtain distribution of an introduction amount in a magnet from shape information of the magnet and information of a Dy introduction face and compute distribution of ΔHcJ in the magnet from the distribution of a Dy introduction amount. Regarding a magnet having a coercivity that is distributed non-uniformly, a J/H curve is computed using the computed distribution of ΔHcJ, and a demagnetizing factor at a predetermined temperature (100° C.) is computed using a temperature coefficient.

17 Claims, 33 Drawing Sheets

(51) Int. Cl.
  *G01R 11/06*  (2006.01)
  *G01R 33/12*  (2006.01)
  *H01F 1/057*  (2006.01)
  *G06F 17/50* (2006.01)
  *H01F 41/02*  (2006.01)

(52) U.S. Cl.
  CPC ............ *H01F 1/057* (2013.01); *H01F 41/0293* (2013.01); *Y02T 10/82* (2013.01)

(56) References Cited

U.S. PATENT DOCUMENTS

| | | |
|---|---|---|
| 2006/0151609 A1 | 7/2006 | Schonenberg et al. |
| 2008/0241513 A1* | 10/2008 | Komuro et al. ............... 428/328 |
| 2010/0079024 A1* | 4/2010 | Komuro et al. .......... 310/156.01 |
| 2010/0109468 A1 | 5/2010 | Natsumeda et al. |
| 2011/0240909 A1* | 10/2011 | Kanda et al. ............... 252/62.55 |

FOREIGN PATENT DOCUMENTS

| | | |
|---|---|---|
| JP | 2006-179963 | 7/2006 |
| JP | 2007-273815 A | 10/2007 |
| JP | 2009-194262 A | 8/2009 |
| JP | 2011-7512 | 1/2011 |
| WO | WO 2006/043348 A1 | 4/2006 |
| WO | WO 2007/102391 A1 | 9/2007 |
| WO | WO 2008/123251 A1 | 10/2008 |
| WO | WO 2009/031292 A1 | 3/2009 |

\* cited by examiner

F I G. 9
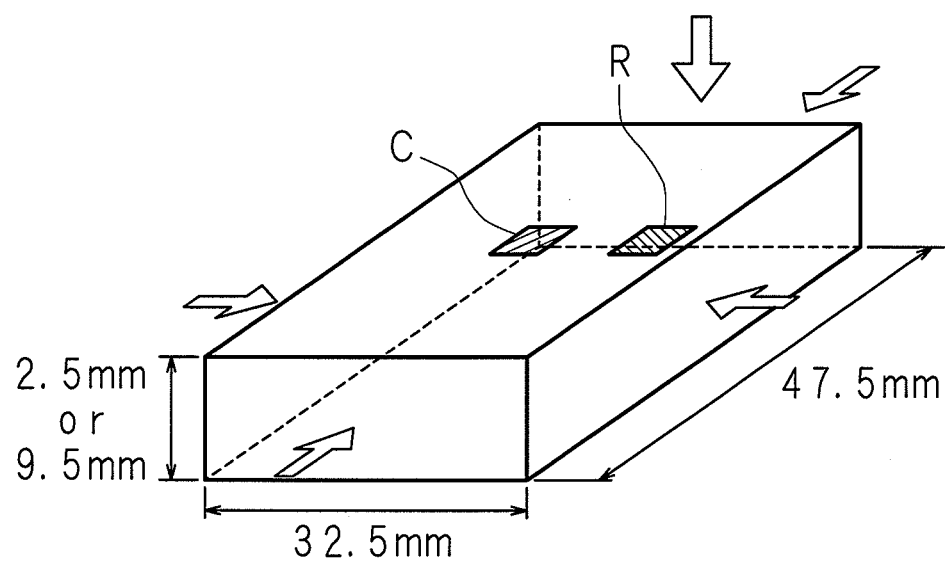

F I G. 17
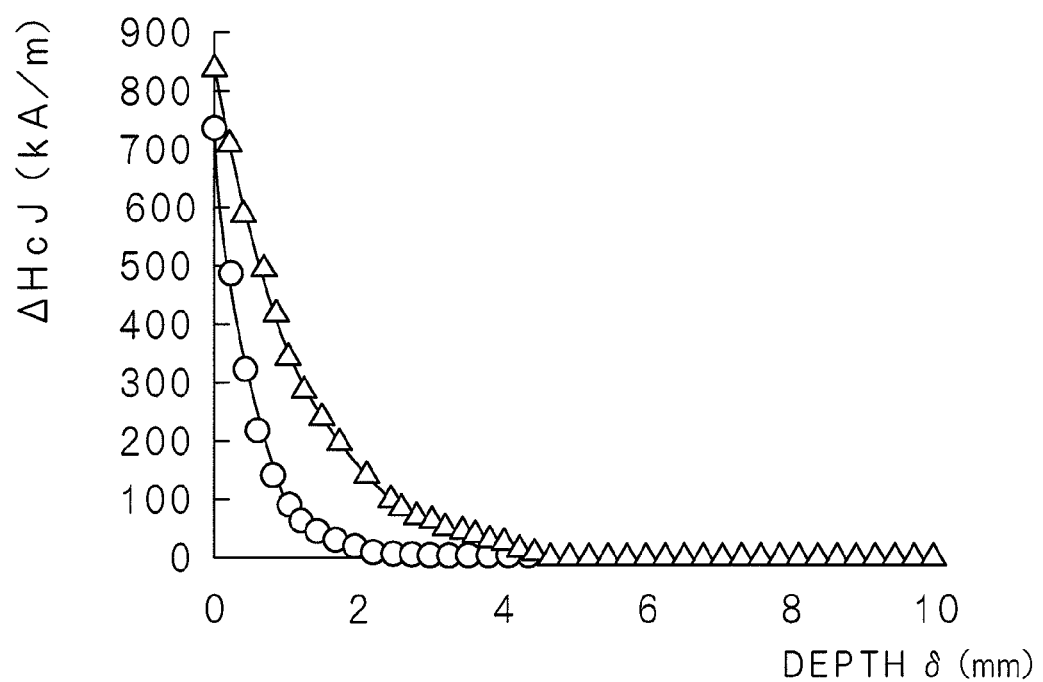

F I G. 1 8
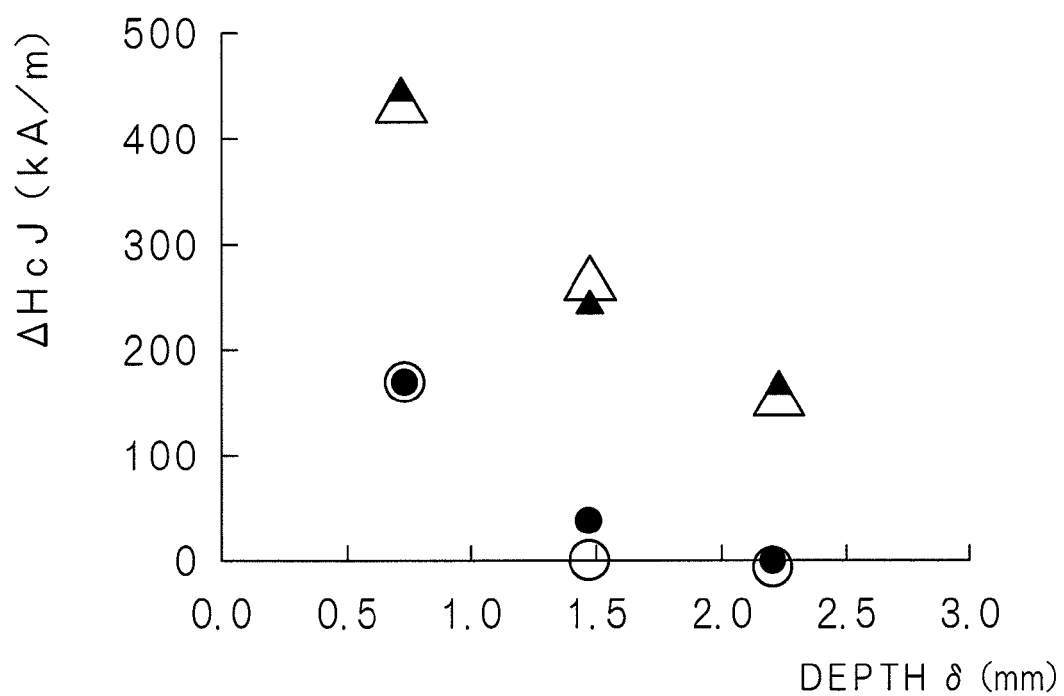

FIG. 19
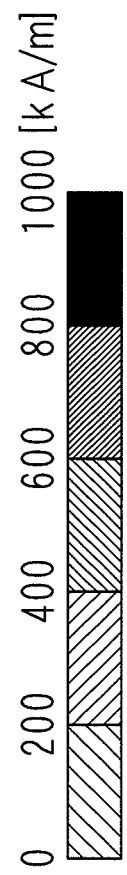 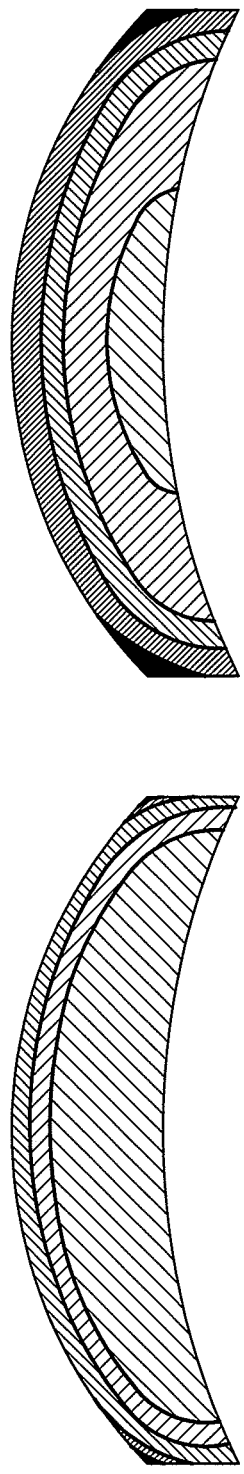
DIFFUSED MEMBER A    DIFFUSED MEMBER B
ΔHcJ DISTRIBUTION FIG. 25
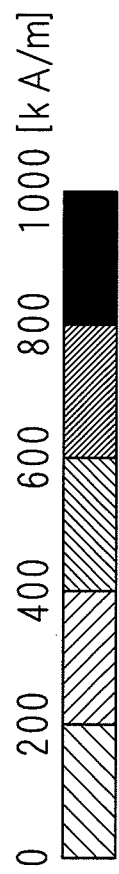
DIFFUSED MEMBER C　　DIFFUSED MEMBER D
ΔHcJ DISTRIBUTION F I G. 26
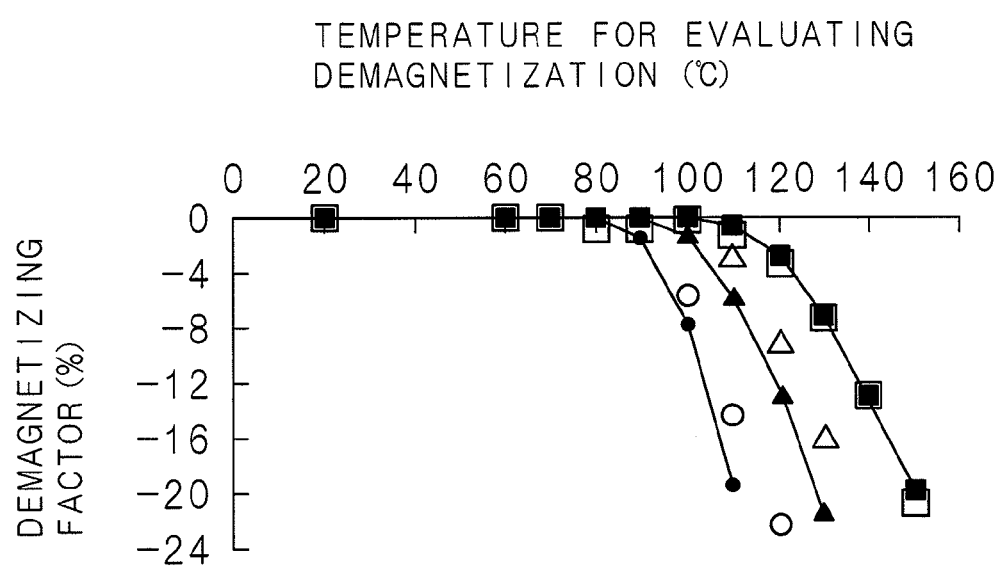

FIG. 31
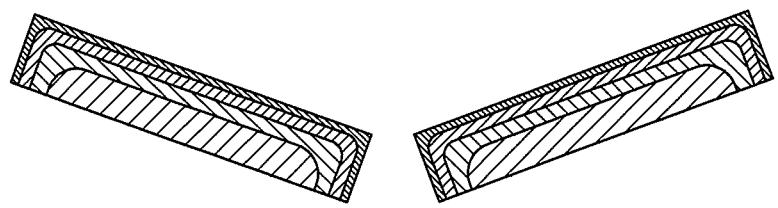
DIFFUSED MEMBER E
ΔHcJ DISTRIBUTION

BASE MATERIAL (92°C)

DIFFUSED MEMBER E (113°C)

Br DECREASE RATE IN DEMAGNETIZATION BY 2%

MAGNETIC FORCE CHARACTERISTIC COMPUTING METHOD, MAGNETIC FORCE CHARACTERISTIC COMPUTING DEVICE AND COMPUTER PROGRAM

This application is the national phase under 35 U.S.C. §371 of PCT International Application No. PCT/JP2011/052606 which has an International filing date of Feb. 8, 2011 and designated the United States of America.

BACKGROUND

1. Technical Field

The present invention relates to a method for preliminarily storing information of a magnet and computing a magnetic force characteristic of a magnet with operation means, and more particularly to a magnetic force characteristic computing method, a magnetic force characteristic computing device and a computer program that can compute a magnetic force characteristic, especially a demagnetization characteristic, of the inside of an Nd—Fe—B series sintered magnet prepared by diffusing dysprosium from the surface of a magnet into an outer periphery of the main phase of the magnet or any other magnet prepared by diffusing a heavy rare-earth element such as dysprosium from the surface of a magnet into the inside of the magnet, with a high degree of accuracy.

2. Description of Related Art

An Nd—Fe—B series sintered magnet is used as a high-performance permanent magnet for various devices, especially hard disk drives or various kinds of motors.

A remanence of an Nd—Fe—B series sintered magnet sometimes decreases (demagnetization) when the magnet is exposed to high temperature or a demagnetizing field is applied. Such demagnetization includes "reversible demagnetization" in which the remanence recovers when the temperature is returned to an ordinary temperature and "irreversible demagnetization" in which the remanence does not recover. Since the various devices mentioned above are used at various temperatures, there is a need that irreversible demagnetization does not occur even when a demagnetizing field is applied at a high temperature. A conventionally utilized technique is to substitute Nd in a main phase of an Nd—Fe—B series sintered magnet with a heavy rare-earth element such as dysprosium (Dy) by adding the heavy rare-earth element to the magnet so as to prepare a magnet having a high coercivity, in which irreversible demagnetization does not occur even when a demagnetizing field is applied at a high temperature. The "irreversible demagnetization" will be hereinafter expressed simply as "demagnetization" in the present specification.

In the method of substituting Nd in an Nd—Fe—B sintered magnet with a heavy rare-earth element, however, the remanence still lowers when a coercivity increases. Moreover, it is required to reduce the amount of a heavy rare-earth element to be used while maintaining the heat resistance, since a heavy rare-earth element is a scarce resource. Therefore, a technique has been proposed to supply a heavy rare-earth element such as dysprosium from a diffusion source to the surface of a magnet and make a layer having a high density of a heavy rare-earth element at an outer periphery of the main phase of the magnet by thermal diffusion mainly consisting of grain boundary diffusion (WO 2007/102391).

Disclosed in WO 2006/43348 is a technique to diffuse a heavy rare-earth element such as dysprosium from the surface of a magnet into the magnet. This enables manufacturing of a high-performance permanent magnet having an enhanced coercivity while inhibiting lowering of the remanence of the entire permanent magnet.

When a magnet is used for a motor or the like, it is important to know the magnetic force characteristic of the magnet, especially a demagnetizing factor due to heat or the like, in order to design a magnet appropriately and to decide specifications such as characteristics of a motor. Disclosed in Japanese Patent No. 4228649, Japanese Patent Application Laid-Open No. 2004-257879 and WO 2008/123251 are methods for evaluating demagnetization of a permanent magnet.

[Patent Document 3] Japanese Patent No. 4228649

SUMMARY

In an Nd—Fe—B series sintered magnet prepared by diffusing dysprosium from the surface of a magnet through a grain boundary into the inside of the magnet to cause non-uniform distribution thereof in an outer periphery of the main phase or any other magnet prepared by diffusing a heavy rare-earth element such as dysprosium from the surface of a magnet into the magnet, a coercivity is especially high in the vicinity of the surface of the magnet and is not uniform in the depth direction. Moreover, a coercivity changes non-linearly with temperature change and a demagnetizing field also varies with location, and therefore a demagnetizing factor also varies with location. Accordingly, there is a need to obtain a demagnetizing factor at each location inside a magnet having a different coercivity, in order to obtain a demagnetizing factor with a high degree of accuracy regarding an Nd—Fe—B sintered magnet prepared by diffusing a heavy rare-earth element from the surface of a magnet into an outer periphery of the main phase to cause non-uniform distribution thereof.

All of the techniques disclosed in Japanese Patent No. 4228649, Japanese Patent Application Laid-Open No. 2004-257879 and WO 2008/123251 are methods for obtaining a demagnetizing factor for each location in a magnet, wherein an initial value is computed from a magnetic flux density and a demagnetizing factor of the entire magnet measured in the bulk. In contrast, the present inventor has found that it is possible to reproduce an actual measured value with a high degree of accuracy as a result of estimating distribution of a coercivity in a magnet after diffusion treatment using information of a known coercivity increment of a dysprosium diffused magnet. When coercivity distribution before demagnetization in an Nd—Fe—B series sintered magnet prepared by diffusing a heavy rare-earth element can be estimated, it is then possible to compute a demagnetizing factor at a different part in the magnet with a high degree of accuracy.

The present invention has been made in view of such a finding, and the object thereof is to provide a magnetic force characteristic computing method, a magnetic force characteristic computing device and a computer program that can compute a magnetic force characteristic, especially a demagnetization characteristic, of the inside of an Nd—Fe—B series sintered magnet prepared by diffusing a heavy rare-earth element to cause non-uniform distribution thereof in an outer periphery of the main phase or any other magnet prepared by diffusing a heavy rare-earth element from the surface of a magnet.

A magnetic force characteristic computing method according to the present invention is a method for obtaining a magnetic force characteristic in a magnet prepared by introducing a heavy rare-earth element from a surface of a magnet and diffusing the heavy rare-earth element into an outer periphery of the main phase or in a magnet prepared by diffusing a heavy rare-earth element into inside of a magnet, characterized by comprising: preliminarily storing depth/coercivity increment characteristic information on distribution of an increment of a coercivity due to diffusion of a heavy rare-earth element against depth from a surface of a magnet and introduction amount/coercivity increment characteristic information on a characteristic of an increment of a coercivity due to diffusion against introduction amount of a heavy rare-earth element; a first step of obtaining depth/introduction amount characteristic information on introduction amount distribution of a heavy rare-earth element against depth, from the stored depth/coercivity increment characteristic information and the stored introduction amount/coercivity increment characteristic information; a second step of accepting shape information on a dimension and a shape of the magnet; a third step of accepting introduction face information on one or a plurality of faces where a heavy rare-earth element has been introduced, in accordance with the accepted shape information; a fourth step of computing introduction amount distribution in the magnet of a heavy rare-earth element introduced from the one or a plurality of faces for each face, based on the accepted shape information, the accepted introduction face information and the obtained depth/introduction amount characteristic information; a fifth step of obtaining introduction amount distribution in an entire magnet from introduction amount distribution obtained for each face in the fourth step; and a sixth step of obtaining distribution of a coercivity increment due to diffusion in the magnet, based on the introduction amount distribution in the entire magnet obtained in the fifth step and the stored introduction amount/coercivity increment characteristic information.

A magnetic force characteristic computing method according to the present invention is characterized in that introduction amount distribution against depth exceeding a distance from a face of the magnet where a heavy rare-earth element is introduced to a rear face in the introduction amount distribution of a heavy rare-earth element against depth is folded back at the rear face functioning as a symmetry plane and added repeatedly until no difference remains in introduction amount distribution in the fourth step.

A magnetic force characteristic computing method according to the present invention is characterized in that a coercivity increment in the depth/coercivity increment characteristic information or in the depth/introduction amount characteristic information is expressed by an approximation formula of an exponential function of a depth.

A magnetic force characteristic computing method according to the present invention is characterized by further comprising: preliminarily storing a magnetization curve before diffusion of a heavy rare-earth element and information of a temperature coefficient on a coercivity variation due to temperature change of a magnet against different coercivities; a seventh step of obtaining a magnetization curve at a first predetermined temperature at each location of the magnet, based on the stored magnetization curve and the distribution of a coercivity increment obtained in the sixth step; an eighth step of computing a magnetization curve at a second predetermined temperature, based on the obtained magnetization curve and the stored information of a temperature coefficient; and a ninth step of computing a demagnetizing factor at the first predetermined temperature after different demagnetizing fields are applied to respective locations at the second temperature causing demagnetization, based on the magnetization curve computed in the eighth step.

A magnetic force characteristic computing method according to the present invention is characterized by further comprising: a tenth step of obtaining a demagnetization characteristic at different temperatures of the magnet, based on the distribution of a coercivity increment obtained in the sixth step; and an eleventh step of specifying a demagnetization temperature at which a demagnetizing factor of the magnet becomes equal to or lower than a predetermined value.

A magnetic force characteristic computing device according to the present invention is a magnetic force characteristic computing device for obtaining a magnetic force characteristic in a magnet prepared by introducing a heavy rare-earth element from a surface of a magnet and diffusing the heavy rare-earth element into an outer periphery of the main phase or in a magnet prepared by diffusing a heavy rare-earth element into inside of a magnet, characterized by comprising: means for preliminarily storing depth/coercivity increment characteristic information on distribution of an increment of a coercivity due to diffusion of a heavy rare-earth element against depth from a surface of a magnet and introduction amount/coercivity increment characteristic information on a characteristic of an increment of a coercivity due to diffusion against introduction amount of a heavy rare-earth element; means for obtaining depth/introduction amount characteristic information on introduction amount distribution of a heavy rare-earth element against depth, from the stored depth/coercivity increment characteristic information and the stored introduction amount/coercivity increment characteristic information; means for accepting shape information on a dimension and a shape of the magnet; means for accepting introduction face information on one or a plurality of faces where a heavy rare-earth element has been introduced, in accordance with the shape information; means for computing introduction amount distribution in the magnet of a heavy rare-earth element introduced from the one or a plurality of faces for each face, based on the accepted shape information, the accepted introduction face information and the obtained depth/introduction amount characteristic information; means for obtaining introduction amount distribution in an entire magnet from introduction amount distribution obtained for each face; and means for computing distribution of a coercivity increment due to diffusion in the magnet, based on the obtained introduction amount distribution in the entire magnet and the stored introduction amount/coercivity increment characteristic information.

A magnetic force characteristic computing device according to the present invention is characterized by further comprising: means for preliminarily storing a coercivity before diffusion of a heavy rare-earth element and information of a temperature coefficient on a coercivity variation due to temperature change of a magnet against different coercivities; means for obtaining a magnetization curve at a first predetermined temperature of the magnet, based on a stored magnetization curve and the obtained distribution of a coercivity increment in the magnet; means for computing a magnetization curve at a second predetermined temperature, based on the obtained magnetization curve and the stored information of a temperature coefficient; and means for computing a demagnetizing factor at the first predetermined temperature after different demagnetizing fields are applied to respective locations at the second temperature causing demagnetization, based on the computed magnetization curve.

A computer program according to the present invention is a computer program for causing a computer provided with storage means to compute a magnetic force characteristic in a magnet prepared by introducing a heavy rare-earth element from a surface of a magnet and diffusing the heavy rare-earth element into an outer periphery of the main phase or in a magnet prepared by diffusing a heavy rare-earth element into inside of a magnet, using depth/coercivity increment characteristic information on distribution of an increment of a coercivity due to diffusion of a heavy rare-earth element against depth from a surface of a magnet and introduction amount/coercivity increment characteristic information on a characteristic of an increment of a coercivity due to diffusion against introduction amount of a heavy rare-earth element stored in the storage means, characterized by causing a computer to execute: a first step of obtaining depth/introduction amount characteristic information on introduction amount distribution of a heavy rare-earth element against depth, from stored depth/coercivity increment characteristic information and stored introduction amount/coercivity increment characteristic information; a second step of accepting shape information on a dimension and a shape of the magnet; a third step of accepting introduction face information on one or a plurality of faces where a heavy rare-earth element has been introduced, in accordance with the shape information; a fourth step of computing introduction amount distribution in the magnet of a heavy rare-earth element introduced from the one or a plurality of faces for each face, based on the accepted shape information, the accepted introduction face information and the obtained depth/introduction amount characteristic information; a fifth step of computing introduction amount distribution in an entire magnet from introduction amount distribution obtained for each face; and a sixth step of obtaining distribution of a coercivity increment due to diffusion in the magnet, based on the computed introduction amount distribution in the entire magnet and the stored introduction amount/coercivity increment characteristic information.

A computer program according to the present invention is characterized by further using storage means storing a magnetization curve before diffusion of a heavy rare-earth element and information of a temperature coefficient on a coercivity variation due to temperature change of a magnet against different coercivities and causing the computer to further execute: a seventh step of obtaining a magnetization curve at a first predetermined temperature of the magnet, based on the stored magnetization curve and the distribution of a coercivity increment obtained in the sixth step; an eighth step of computing a magnetization curve at a second predetermined temperature, based on the obtained magnetization curve and the stored information of a temperature coefficient; and a ninth step of computing a demagnetizing factor at the first predetermined temperature after different demagnetizing fields are applied to respective locations at the second temperature causing demagnetization, based on the computed magnetization curve.

In the present invention, distribution of an introduction amount of a heavy rare-earth element such as dysprosium according to the structure of a magnet to be computed is obtained from information on the shape of a magnet having a magnetic force characteristic to be computed and on an introduction face of the heavy rare-earth element, based on obtained introduction amount distribution against depth from an introduction face. Distribution of a coercivity increment due to diffusion of a heavy rare-earth element in a magnet is obtained from the obtained distribution of an introduction amount. Use of the obtained distribution of a coercivity increment makes it possible to estimate a coercivity varying with location after diffusion with a high degree of accuracy from a uniform coercivity before diffusion.

In the present invention, introduction amount distribution against depth exceeding a distance from an introduction face to a rear face is folded back and added to introduction amount distribution up to the rear face so as to obtain introduction amount distribution, since a distance from the introduction face of an actual magnet is finite and reflection of an introduced heavy rare-earth element to the inside at the inner side of the interfacial boundary is estimated, though a depth of introduction amount distribution of a heavy rare-earth element against depth preliminarily obtained corresponds to an infinite length when obtaining introduction amount distribution from each introduction face of a magnet having a magnetic force characteristic to be computed in the invention described above. This makes it possible to obtain distribution of an introduction amount of a heavy rare-earth element in a magnet with a high degree of accuracy and also enhance the accuracy of distribution of a coercivity variation to be obtained.

In the present invention, stored and used is a formula prepared by approximating distribution of a coercivity increment against depth of a magnet, not by information of a coercivity increment for each different depth, but by an exponential function having a depth as a parameter. This makes it possible to reduce the amount of information to be stored and eliminate the need for processing such as complementation, while maintaining the computation accuracy.

In the present invention, a magnetization curve at a first predetermined temperature (e.g., ordinary temperature) at each location of the magnet after diffusion is obtained based on a magnetization curve of a homogeneous magnet (base material) before diffusion and the distribution of a coercivity increment obtained in the invention described above. Moreover, a magnetization curve at a second predetermined temperature (e.g., heating temperature) at each location of the magnet after diffusion is obtained based on the obtained magnetization curve and information of a temperature coefficient on a temperature variation of a coercivity stored for each different coercivity. Furthermore, a magnetization curve (magnetic force characteristic) at each location in the magnet is obtained after a different demagnetizing field is first applied at the second predetermined temperature and then the temperature is returned to the first temperature (ordinary temperature). This makes it possible to compute a demagnetizing factor as the entire magnet with a high degree of accuracy.

It is preferable to approximate information of a temperature coefficient as a quadratic function of a coercivity and store the result, so that it becomes possible to compute a magnetic force characteristic of an Nd—Fe—B series sintered magnet after diffusing a heavy rare-earth element, which has a coercivity value varying with location, that is, which has non-uniform coercivity distribution, with a high degree of accuracy.

In the present invention, a magnetization curve in a loaded state at the first predetermined temperature (e.g., ordinary temperature) of a magnet after diffusion is obtained with a high degree of accuracy based on a magnetization curve of a homogeneous magnet (base material) before diffusion and the distribution of a coercivity increment obtained in the invention described above. Furthermore, a demagnetizing factor of the entire magnet at the first temperature is obtained based on information of a temperature coefficient on a temperature variation of a coercivity stored for each different coercivity when a different demagnetizing field is applied at a plurality of second temperatures corresponding to different coercivities at each location in the magnet at a plurality of different second temperatures causing demagnetization, and a demagnetization temperature at which a demagnetizing factor becomes equal to or lower than a predetermined value is specified. This makes it possible to compute a demagnetization characteristic at a high temperature with a high degree of accuracy as a magnetic force characteristic of an Nd—Fe—B series sintered magnet prepared by diffusing a heavy rare-earth element.

With the present invention, it becomes possible to estimate distribution of a coercivity varying with location in an Nd—Fe—B series sintered magnet prepared by diffusing a heavy rare-earth element such as dysprosium to cause non-uniform distribution thereof in an outer periphery of the main phase of the magnet or in any other magnet prepared by diffusing a heavy rare-earth element into a magnet with a high degree of accuracy by computation, and therefore it is possible to compute a magnetic force characteristic as the entire magnet with a high degree of accuracy.

In particular, regarding a magnet intended for use at a high temperature in a motor or the like, it is required to compute an irreversible lowering rate of a remanence, or a so-called an irreversible demagnetizing factor, with a high degree of accuracy. With the present invention, it is also possible to compute a demagnetizing factor with a high degree of accuracy even when diffusion and change in a coercivity against temperature are distributed non-uniformly in an Nd—Fe—B series sintered magnet prepared by diffusing a heavy rare-earth element.

The above and further objects and features will more fully be apparent from the following detailed description with accompanying drawings.

BRIEF DESCRIPTION OF THE SEVERAL VIEWS OF THE DRAWINGS

FIG. 9 is an explanatory diagram illustrating shape information of a magnet used for verification of the computation accuracy of coercivity increment ΔHcJ distribution.

FIG. 17 is a graph illustrating actual measured values of a correspondence relation of depth δ/ΔHcJ of a magnet of Example 1.

FIG. 18 is a graph illustrating a result of comparison between actual measured values and computed results of δ/ΔHcJ regarding the magnet of Example 1.

FIG. 19 is a schematic diagram for schematically illustrating an example of ΔHcJ distribution computed regarding the magnet of Example 1.

FIG. 25 is a schematic diagram for schematically illustrating an example of ΔHcJ distribution computed regarding the magnet of Example 2.

FIG. 26 is a graph illustrating an example of comparison between computation results and actual measurement results of a demagnetization characteristic of an IPM motor provided with the magnet of Example 2 having the ΔHcJ distribution illustrated in FIG. 25.

FIG. 31 is a schematic diagram for schematically illustrating an example of ΔHcJ distribution computed regarding the magnet of Example 3.

DETAILED DESCRIPTION

The following description will explain the present invention in concrete terms with reference to the drawings illustrating some embodiments thereof.

It is to be noted that the following embodiments will be explained using an example, which causes a computer to execute a magnetic force characteristic computing method based on a computer program according to the present invention and to operate as a magnetic force characteristic computing device, so as to compute a magnetic force characteristic of an Nd—Fe—B series sintered magnet prepared by diffusing dysprosium (which will be hereinafter written as "Dy") as a heavy rare-earth element.

Figure 1:
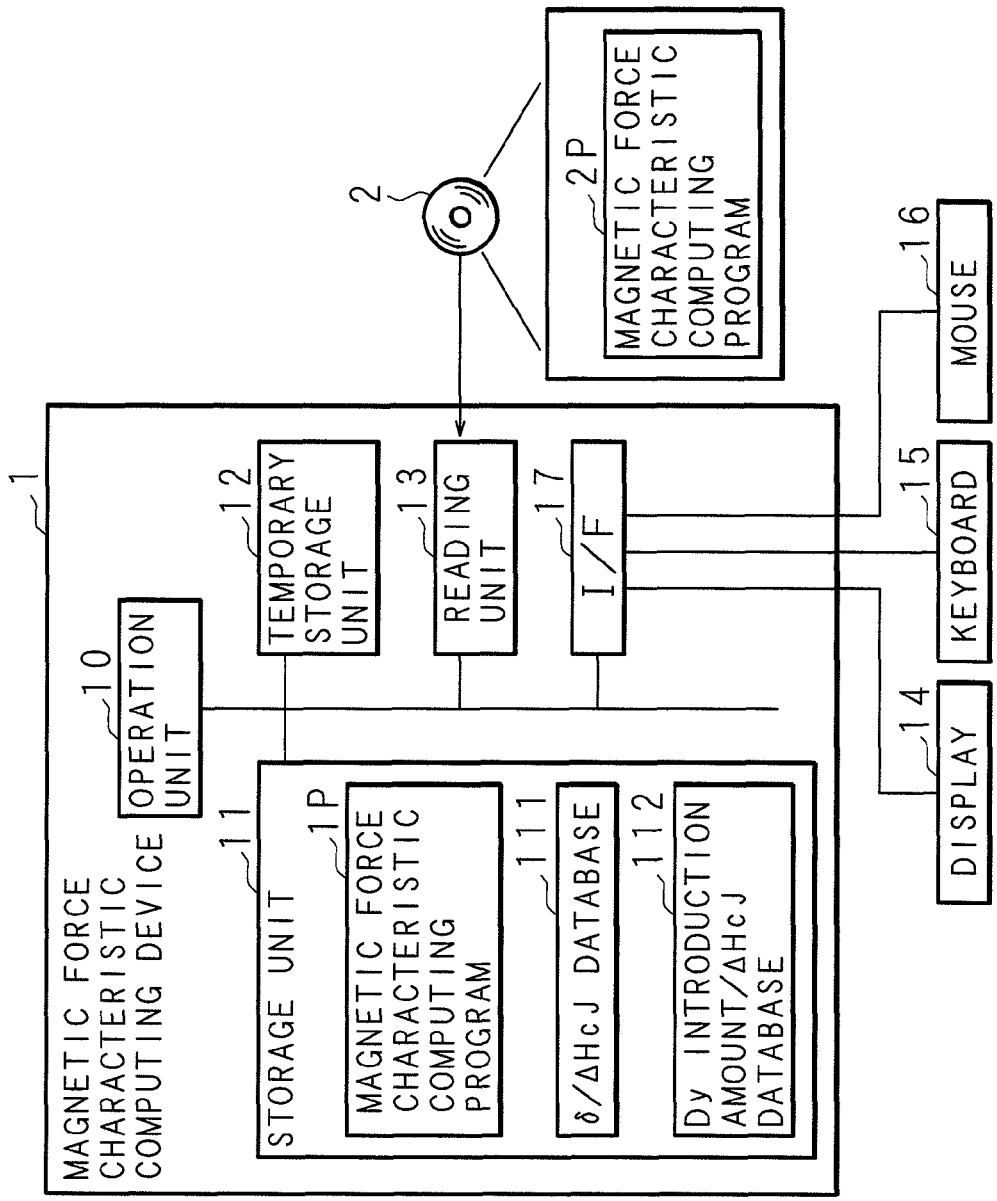
FIG. 1 is a block diagram illustrating the structure of a magnetic force characteristic computing device according to the present embodiment.

FIG. 1 is a block diagram illustrating the structure of a magnetic force characteristic computing device 1 according to the present embodiment. The magnetic force characteristic computing device 1 according to the present embodiment is implemented by a personal computer. The magnetic force characteristic computing device 1 has: an operation unit 10 for controlling operations of the respective components and executing an operation; a storage unit 11 for storing various kinds of information; a temporary storage unit 12 to be utilized for processing of the operation unit 10; a reading unit 13 for reading out information from a portable recording medium 2; and an interface (I/F) 17 for performing relay functions between the operation unit 10 and input-output devices such as a display 14, a keyboard 15 and a mouse 16.

Used as the operation unit 10 is a CPU (Central Processing Unit), an MPU (Micro Processing Unit) or the like. The operation unit 10 reads out a magnetic force characteristic computing program 1P stored in the storage unit 11 and executes the program. This causes the operation unit 10 to execute respective processes for computing a magnetic force characteristic of an Nd—Fe—B series sintered magnet for use in designing.

Used as the storage unit 11 is an external storage device such as a hard disk or an SSD (Solid State Drive). The storage unit 11 stores a δ/ΔHcJ database (depth/coercivity increment characteristic information) 111 and a Dy introduction amount/ΔHcJ database (introduction amount/coercivity increment characteristic information) 112, which will be described later, in addition to the magnetic force characteristic computing program 1P described above, so that the operation unit 10 can refer in the process of computing a magnetic force characteristic.

Used as the temporary storage unit 12 is a volatile random access memory such as a DRAM (Dynamic Random Access Memory) or an SRAM (Static RAM). The temporary storage unit 12 temporarily stores various kinds of information to be generated by processing of the operation unit 10, such as the magnetic force characteristic computing program 1P to be read out from the storage unit 11.

The reading unit 13 can read out data from the portable recording medium 2 such as a DVD, a CD-ROM or a flexible disk. Recorded in the portable recording medium 2 is a magnetic force characteristic computing program 2P for causing a computer to operate as a magnetic force characteristic computing device 1. The magnetic force characteristic computing program 1P stored in the storage unit 11 may be obtained by copying the magnetic force characteristic computing program 2P, which is read out from the portable recording medium 2 by the operation unit 10 with the reading unit 13.

The I/F 17 performs: a process of outputting image information or the like outputted by the operation unit 10 as will be described later to the display 14; a process of detecting information to be inputted through the keyboard 15 and sending notification to the operation unit 10; a process of detecting information to be inputted through the mouse 16 and sending notification to the operation unit 10; and the like. An operator (technical personnel), who operates the magnetic force characteristic computing device 1 for designing a magnet and a product provided with a magnet, can utilize the keyboard 15 and the mouse 16 to input information on a magnet which he utilizes for designing and cause the operation unit 10 to compute characteristics of the magnet.

An explanation will be given about the process of computation of a demagnetizing factor due to heat and a demagnetizing field as a magnetic force characteristic of an Nd—Fe—B series sintered magnet prepared by diffusing a heavy rare-earth element such as Dy, at the magnetic force characteristic computing device 1 having the structure described above. Here, the explanation will be given using an example wherein Dy is used as a heavy rare-earth element to be diffused. First, the operation unit 10 obtains distribution of an increment (ΔHcJ) of a coercivity (HcJ) after Dy diffusion in a magnet having a characteristic to be computed. The operation unit 10 then obtains coercivity (HcJ) distribution in the magnet based on a coercivity of a base material before diffusion, specifies a J/H curve at each location, and computes a demagnetizing factor after the magnet is first used at a predetermined temperature (a second predetermined temperature, e.g., 100° C.) and then the temperature is returned to an ordinary temperature (a first predetermined temperature, e.g., 20° C.), as a magnetic force characteristic of the entire magnet.

Figure 2:
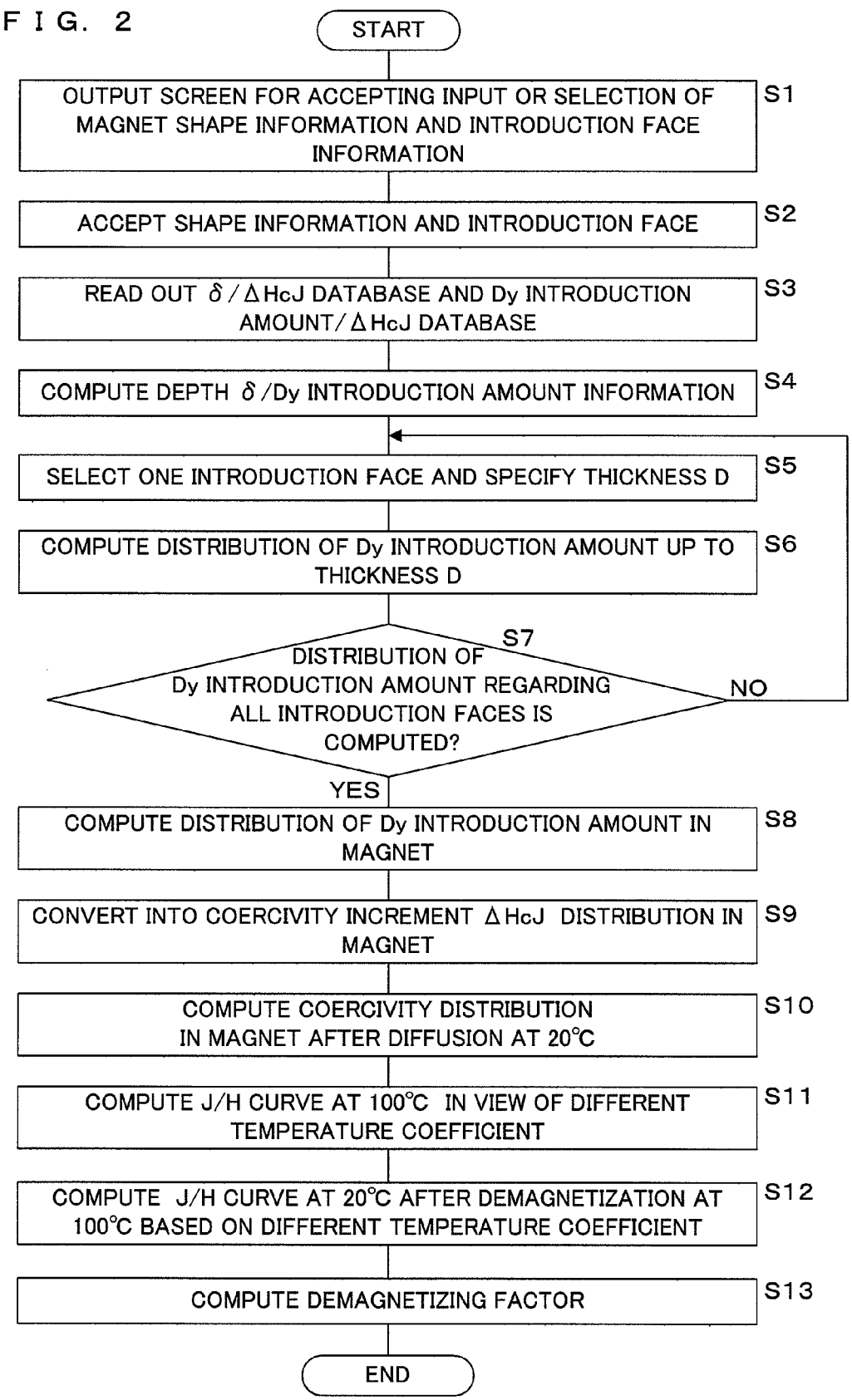
FIG. 2 is a flow chart illustrating an example of a magnetic force characteristic computing process to be executed by an operation unit of the magnetic force characteristic computing device according to the present embodiment.

FIG. 2 is a flow chart illustrating an example of the process procedure of the operation unit 10 of the magnetic force characteristic computing device 1 according to the present embodiment for computing a magnetic force characteristic of a magnet after Dy diffusion.

The operation unit 10 creates a screen for accepting input or selection of shape information of a magnet and information on which face of a magnet Dy is to be introduced from, and outputs the screen via the I/F 17 to the display 14 (step S1). The operation unit 10 accepts input of shape information of a magnet and selection of a Dy introduction face using the keyboard 15 and the mouse 16 via the I/F 17 (step S2).

Shape information of a magnet to be accepted in the step S2 is, for example, mesh information (node and element information) of a finite element method. Similarly, information of a Dy introduction face to be accepted in the step S2 is information for specifying the number of introduction faces and the respective introduction faces corresponding to the shape information.

The operation unit 10 reads out the δ/ΔHcJ database 111 on distribution of a coercivity increment ΔHcJ against depth δ from a Dy introduction face and the Dy introduction amount/ΔHcJ database 112 stored in the storage unit 11 (step S3) and computes δ/Dy introduction amount information on a correspondence between a depth δ and a Dy introduction amount (step S4).

The operation unit 10 selects one introduction face based on the shape information and the information of a Dy introduction face accepted in the step S2, and specifies the limitation of a depth δ for the selected introduction face, i.e., a thickness D from the selected introduction face to the rear face (step S5). The operation unit 10 computes distribution of a Dy introduction amount up to the specified thickness D based on the δ/Dy introduction amount information computed in the step S4 in view of a Neumann boundary condition (step S6). The Neumann boundary condition will be described later.

The operation unit 10 then determines whether all introduction faces are selected and each distribution of a Dy introduction amount is computed or not (step S7). When determining that distribution of a Dy introduction amount regarding any introduction face is not computed (S7: NO), the operation unit 10 returns processing to the step S5 and computes distribution of a Dy introduction amount regarding a remaining introduction face.

When determining that distribution of a Dy introduction amount regarding all introduction faces is computed (S7: YES), the operation unit 10 sums up distributions of a Dy introduction amount regarding all introduction faces so as to compute distribution of a Dy introduction amount in the magnet (step S8).

The operation unit 10 converts the distribution of a Dy introduction amount in the magnet computed in the step S8 into coercivity increment ΔHcJ distribution in the magnet, based on the Dy introduction amount/ΔHcJ database 112 (step S9).

The operation unit 10 then computes coercivity HcJ distribution after Dy diffusion at an ordinary temperature (20° C.), based on a magnet characteristic of a magnet before diffusion, i.e., a base material of a magnet and the coercivity increment ΔHcJ obtained in the step S9 (step S10). The operation unit 10 computes a J/H curve of a case where the temperature of the magnet rises to a demagnetization evaluation temperature 100° C. as a magnetic force characteristic, based on the computed coercivity HcJ distribution in view of a different temperature coefficient (step S11) and computes a J/H curve of a case where a load such as application of a demagnetizing field is first applied in a state where the temperature of the magnet rises to the demagnetization evaluation temperature 100° C. causing demagnetization and then the temperature is returned to an ordinary temperature (20° C.), based on a stored temperature coefficient (step S12). The operation unit 10 computes a demagnetizing factor at the demagnetization evaluation temperature 100° C. based on the computation results of the steps S11 and S12 (step S13) and terminates the processing. It is to be noted that the demagnetizing factor used here is a rate of decrease in torque of the characteristic of a motor provided with a magnet to be evaluated at an ordinary temperature before and after reaching the demagnetization evaluation temperature.

The following description will explain the respective processes illustrated in the flow chart of FIG. 2 in concrete terms. First, an explanation will be given about computation of a correspondence between a depth δ and a Dy introduction amount based on the δ/ΔHcJ database 111 and the Dy introduction amount/ΔHcJ database 112 in the steps S3 and S4.

Figure 3:
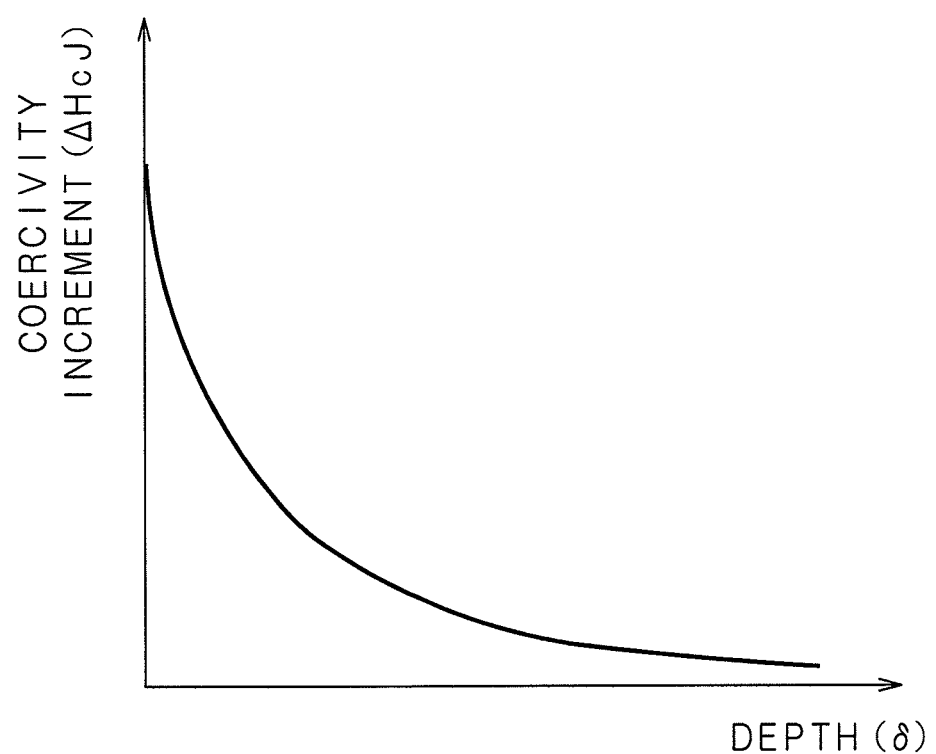
FIG. 3 is an explanatory diagram illustrating an example of the content of a δ/ΔHcJ database.

FIG. 3 is an explanatory diagram illustrating an example of the content of the δ/ΔHcJ database 111. In the explanatory diagram of FIG. 3, a coercivity increment ΔHcJ against depth (distance) δ from a Dy introduction face is illustrated as a graph. Specifically, the δ/ΔHcJ database 111 may be information of a coercivity increment ΔHcJ for every 0.5 mm, for example, or may be a formula obtained by approximating the curve illustrated in the explanatory diagram of FIG. 3 with an exponential function or the like. In the δ/ΔHcJ database 111, a coercivity increment ΔHcJ decreases as a depth δ increases as illustrated in FIG. 3.

Figure 4:
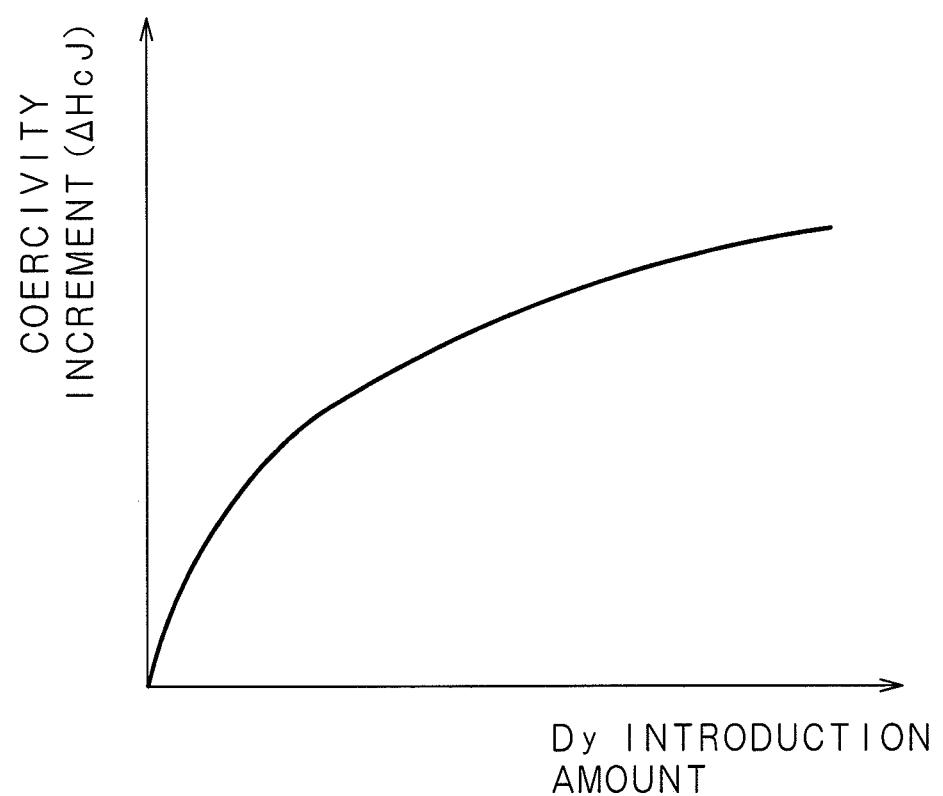
FIG. 4 is an explanatory diagram illustrating an example of the content of a Dy introduction amount/ΔHcJ database.

FIG. 4 is an explanatory diagram illustrating an example of the content of the Dy introduction amount/ΔHcJ database 112. In the explanatory diagram of FIG. 4, a coercivity increment ΔHcJ against Dy introduction amount is illustrated as a graph. Specifically, the Dy introduction amount/ΔHcJ database 112 may be information of a coercivity increment ΔHcJ (standardized by a predetermined unit of an introduction amount) for a plurality of different Dy introduction amounts, or may be a formula obtained by approximating the curve illustrated in the explanatory diagram of FIG. 4.

In the step S4, distribution of a Dy introduction amount against depth δ is computed using the δ/ΔHcJ database 111 and the Dy introduction amount/ΔHcJ database 112, which have the relations illustrated in FIGS. 3 and 4.

Figure 5:
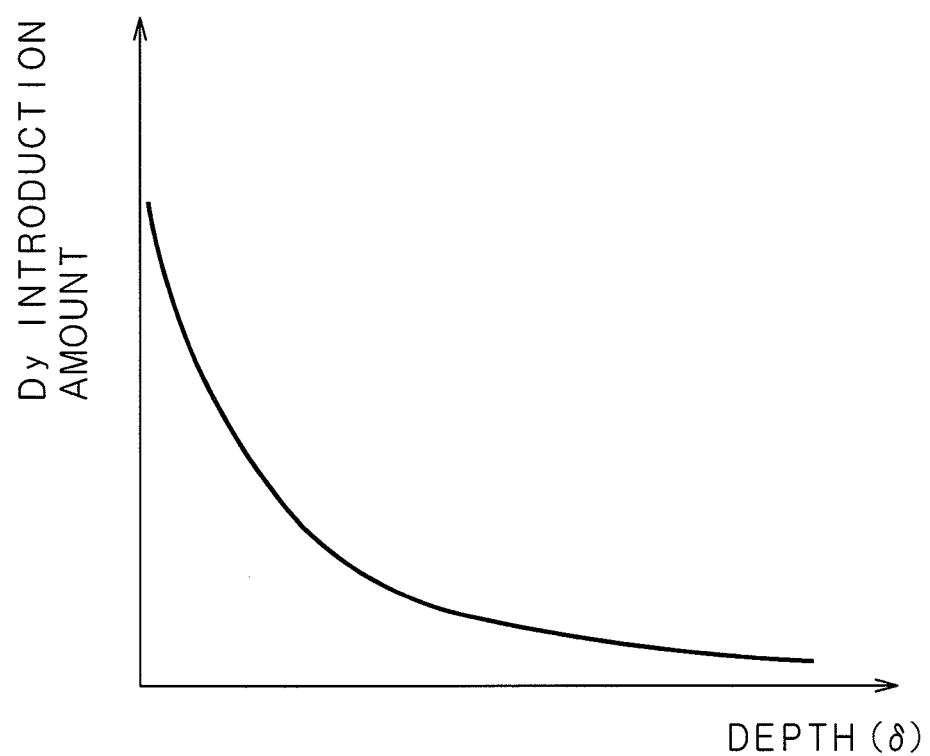
FIG. 5 is an explanatory diagram illustrating a correspondence between a depth δ and a Dy introduction amount to be computed from the δ/ΔHcJ database and the Dy introduction amount/ΔHcJ database.

FIG. 5 is an explanatory diagram illustrating a correspondence between a depth δ and a Dy introduction amount to be computed from the δ/ΔHcJ database 111 and the Dy introduction amount/ΔHcJ database 112. In the explanatory diagram of FIG. 5, distribution of a Dy introduction amount against depth δ is illustrated as a graph. As illustrated in FIG. 5, a Dy introduction amount decreases as a depth δ increases. A correspondence between a depth δ and a Dy introduction amount to be computed in the step S4 may be numerical values of a Dy introduction amount for a plurality of different depths δ, e.g., for every 0.5 mm, or may be a formula obtained by approximating the curve illustrated in the explanatory diagram of FIG. 5 by an exponential function or the like.

Next, a detailed explanation will be given about a computation process of Dy introduction amount distribution in the step S6. The Neumann boundary condition is a boundary condition with which the gradient of a physical quantity becomes zero at the interfacial boundary. Though a Dy introduction amount against depth δ decreases in an exponential manner with distance from an introduction face of the magnet, Dy never outreaches the rear face, and therefore it is to be taken into consideration that reflection occurs at the interfacial boundary of the rear face with the outside of the magnet.

Distribution of a Dy introduction amount against depth δ is computed by folding back a graph of distribution illustrated in FIG. 5 at a depth δ equal to the thickness D and superposing the graph, in view of the Neumann boundary condition. The operation unit 10 carries out an operation by using the obtained Dy introduction amount distribution against depth δ, folding back a graph of a Dy introduction amount against depth δ exceeding the distance (thickness) D from the Dy introduction face to the rear face and respectively adding a Dy introduction amount at each depth. Furthermore, the operation unit 10 carries out an operation so as to fold back the folded graph further at a depth δ=0 and repeat the summation operation.

Figure 6:
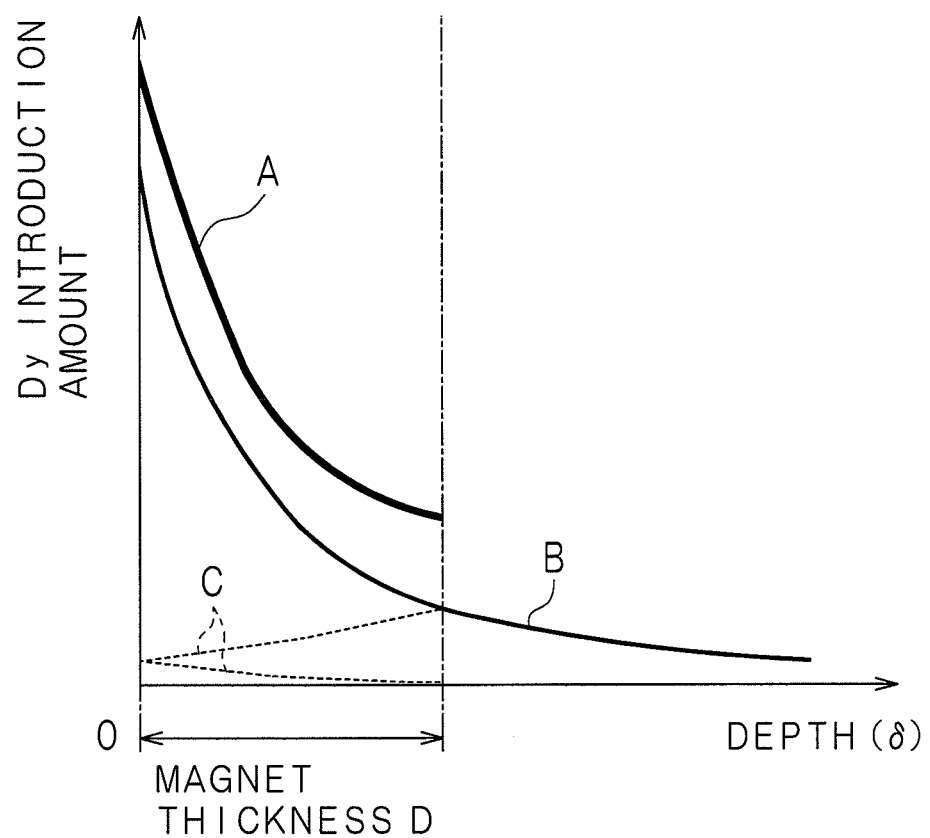
FIG. 6 is a graph illustrating an example of distribution of a Dy introduction amount up to a thickness D corresponding to one introduction face computed by the operation unit of the magnetic force characteristic computing device according to the present embodiment.

FIG. 6 is a graph illustrating an example of distribution of a Dy introduction amount up to a thickness D corresponding to one introduction face computed by the operation unit 10 of the magnetic force characteristic computing device 1 according to the present embodiment. As described above, the operation unit 10 folds back a Dy introduction amount (the B part in FIG. 6) against depth δ, which exceeds the distance (thickness) D from the Dy introduction face to the rear face, at the rear face functioning as a symmetry plane as illustrated with the broken lines C and add the Dy introduction amount.

Here, computation is repeated until no difference due to fold back addition remains. As a result, Dy introduction amount distribution (bold full line A in FIG. 6) corresponding to one introduction face is obtained as illustrated in FIG. 6 from the distribution of a Dy introduction amount illustrated in FIG. 5 against depth δ.

Figure 7:
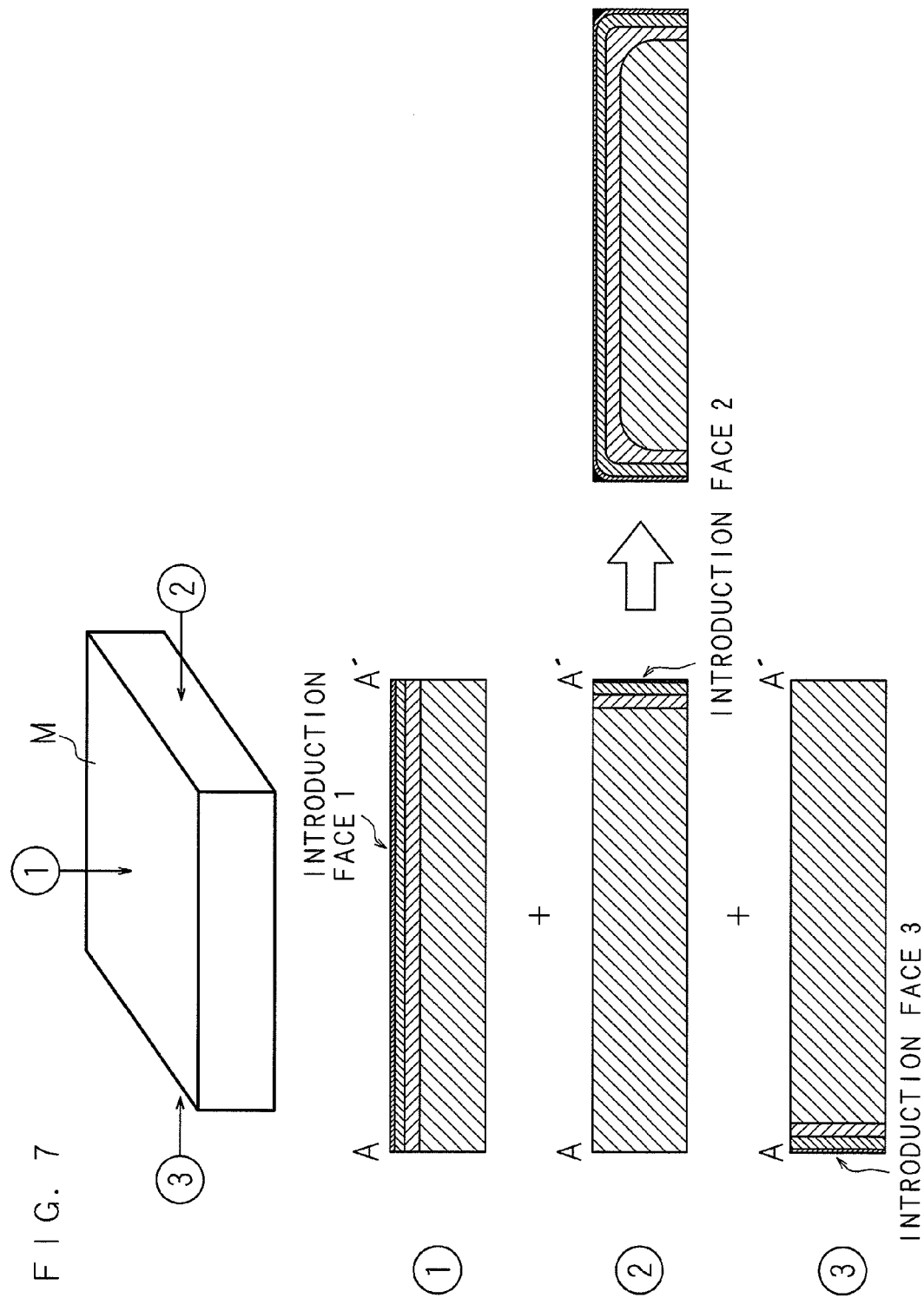
FIG. 7 is an explanatory diagram illustrating an example of processing of the operation unit for obtaining distribution of a Dy introduction amount of the entire magnet from Dy introduction amount distribution obtained for each introduction face.

Next, a detailed explanation will be given about a Dy introduction amount computing process based on Dy introduction amount distribution from each introduction face in the step S8. FIG. 7 is an explanatory diagram illustrating an example of processing of the operation unit 10 for obtaining distribution of a Dy introduction amount of the entire magnet from Dy introduction amount distribution obtained for each introduction face. Illustrated at a left upper part of FIG. 7 is an example of a magnet having a magnetic force characteristic to be computed. The magnet in FIG. 7 has a flat rectangular parallelepiped shape, and Dy is introduced respectively from three introduction faces. One is a flat top face, and the other two are side faces facing each other.

In FIG. 7, distribution of a Dy introduction amount is illustrated in a sectional view, which passes through all of the flat top face and the two facing side faces and divides the magnet in half. Illustrated below the magnet at a left upper part of FIG. 7 are images of distribution of a Dy introduction amount respectively in a case (1) where a flat top face is used as an introduction face, a case (2) where a right side face in the sectional view is used as an introduction face, and a case (3) where a left side face is used as an introduction face.

When a flat top face is used as an introduction face, the largest Dy introduction amount is obtained at the top face and the Dy introduction amount decreases with increase in the depth δ, i.e., with depth towards a lower part. The manner of decrease is expressed by a curve similar to the curve illustrated in FIG. 6. When the right side face is used as an introduction face, the largest Dy introduction amount is obtained at the right side face and the Dy introduction amount decreases with increase in the depth δ, i.e., with width towards the left side face. The manner of decrease is expressed by a curve similar to the curve illustrated in FIG. 6. When the left side face is used as an introduction face, obtained is a result symmetrical to the case where the right side face is used as an introduction face.

Illustrated on the right side of FIG. 7 is a sectional view of a case where Dy introduction amount distributions against depth δ of cases where the respective faces are used as introduction faces are summed up. When Dy is introduced from the top face and the two facing side faces, the largest Dy introduction amount is obtained at the edge part and the Dy introduction amount decreases with distance from the top face and both side faces, as illustrated in FIG. 7.

Figure 8:
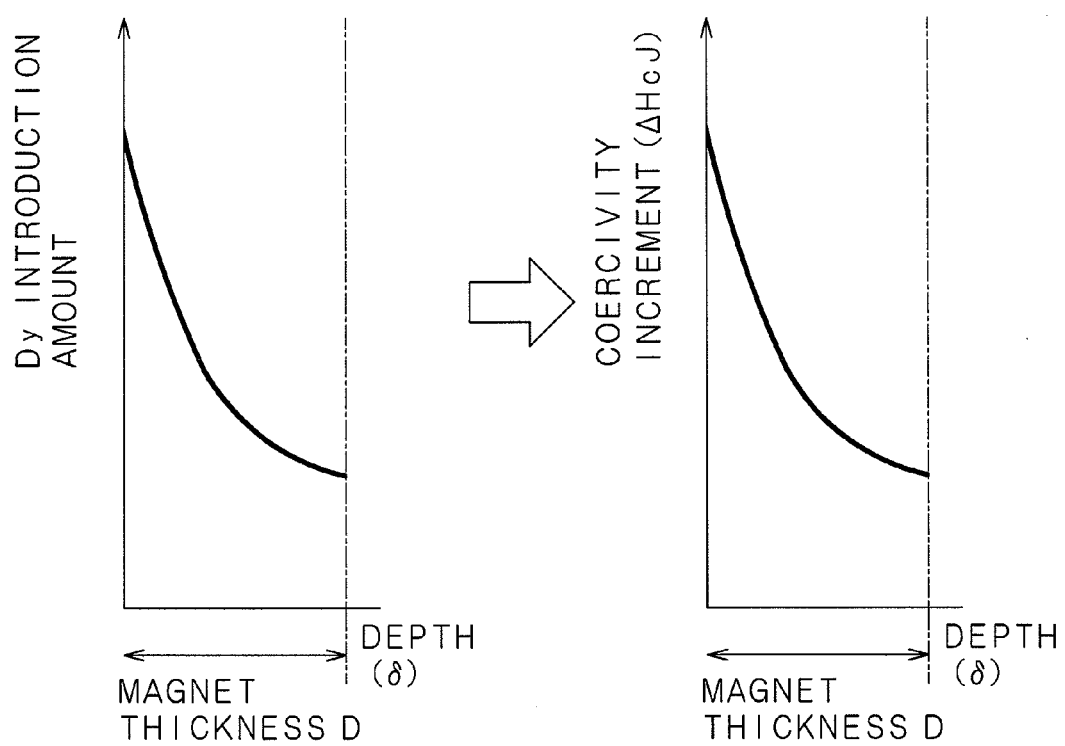
FIG. 8 is an explanatory diagram illustrating Dy introduction amount distribution and converted coercivity increment ΔHcJ distribution in a magnet computed by the operation unit of the magnetic force characteristic computing device according to the present embodiment.

FIG. 8 is an explanatory diagram illustrating Dy introduction amount distribution and converted coercivity increment ΔHcJ distribution in a magnet computed by the operation unit 10 of the magnetic force characteristic computing device 1 according to the present embodiment. Illustrated on the left side of FIG. 8 is Dy introduction amount distribution against depth δ from one introduction face in Dy introduction amount distribution of a magnet, and illustrated on the right side is distribution of a coercivity increment ΔHcJ against depth δ obtained after conversion. Since a correspondence relation between a Dy introduction amount and a coercivity increment ΔHcJ is stored in the Dy introduction amount/ΔHcJ database 112 of the storage unit 11, the operation unit 10 obtains distribution of a coercivity increment ΔHcJ by converting the Dy introduction amount on the ordinate illustrated on the left side of FIG. 8 into distribution of a coercivity increment ΔHcJ. As described above, distributions of a coercivity increment ΔHcJ against depth δ from the respective introduction faces are not summed up, but Dy introduction amount distribution from each introduction face is obtained once. This makes it possible to estimate distribution of a coercivity increment ΔHcJ with a high degree of accuracy in view of the non-linearity of Dy introduction amount/ΔHcJ illustrated in FIG. 4.

Here, a verification result regarding the accuracy of computation of coercivity increment ΔHcJ distribution against depth δ will be illustrated. FIG. 9 is an explanatory diagram illustrating shape information of a magnet used for verification of the computation accuracy of coercivity increment ΔHcJ distribution. Used for verification were flat rectangular parallelepiped magnets, which had length of 47.5 mm, width of 32.5 mm, and thickness of 2.5 mm or 9.5 mm. Dy diffusion was performed for the respective magnets using a method described in Patent Document 1 under the same condition and then a coercivity increment ΔHcJ was measured at a center part C and a rim part R of the top face of magnets. It is to be noted that a rim part of the top face is positioned 2.0 mm away from a long side (47.5 mm) and approximately 24 mm away from a short side (32.5 mm). As illustrated by the white arrows in FIG. 9, Dy was diffused from the top face and respective four side faces into each magnet in the same manner. Here, an ICP (Inductively Coupled Plasma) analysis method was used for measurement of Dy concentration. A coercivity HcJ was measured by cutting out a magnet for each measurement location of 2.8 mm×2.8 mm×1.0 mm and using a VSM (Vibrating Sample Magnetometer). It is to be noted that a plurality of magnets prepared under the same condition were used for measurement in order to make a measurement in the ICP analysis method and in the VSM with a measurement pitch of 0.5 mm.

Figure 10:
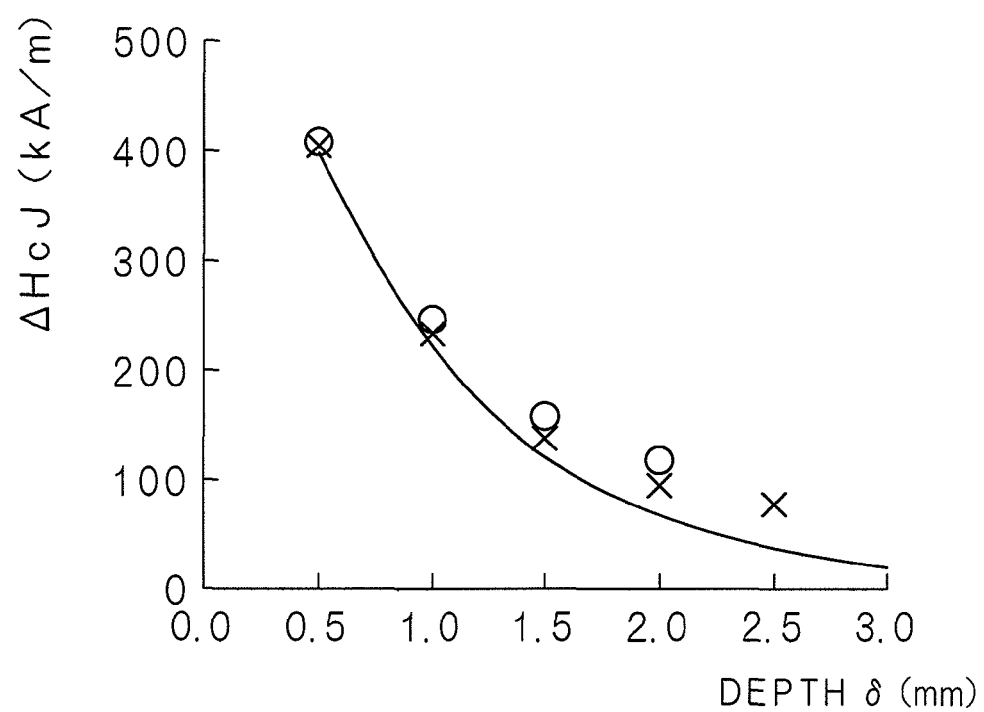
FIG. 10 is a graph illustrating computation results and measurement results of coercivity increment ΔHcJ distribution against depth (distance) δ at a center part C of a top face of a magnet.

FIG. 10 is a graph illustrating computation results and measurement results of coercivity increment ΔHcJ distribution against depth (distance) δ at the center part C of the top face of a magnet. In FIG. 10, the depth δ expressed in the unit "mm (millimeter)" is plotted on the abscissa, while the coercivity increment ΔHcJ expressed in the unit "kA/m (kiloampere per meter)" is plotted on the ordinate. Illustrated by the full line in FIG. 10 is distribution of actual measured values of a coercivity increment ΔHcJ against depth δ of a magnet having a thickness of 9.5 mm. In FIG. 10, the "x" marks are used to indicate computation results of coercivity increment ΔHcJ distribution against depth δ of a magnet having a thickness of 2.5 mm, and the white circles are used to indicate actual measurement results of coercivity increment ΔHcJ distribution of a magnet having a thickness of 2.5 mm.

Coercivity increment ΔHcJ distribution of a magnet having a thickness of 2.5 mm, that is, coercivity increment ΔHcJ distribution of a case where the boundary condition is set as δ=2.5 mm was computed ("x" marks) using a diffusion boundary model illustrated in FIGS. 6 and 8, based on distribution (actual measured correspondence relation of δ/coercivity increment ΔHcJ) of actual measured values of a coercivity increment ΔHcJ against depth δ of a magnet having a thickness of 9.5 mm (boundary condition δ=9.5) illustrated by the full line in FIG. 10. Computation results ("x" marks) corresponding to depths δ of 0.5 mm, 1.0 mm, 1.5 mm and 2.0 mm and actual measurement results (white circles) of a coercivity increment ΔHcJ at the respective depths δ to be obtained are sufficiently different from distribution of a case where the boundary condition is 9.5 mm, and correspond to each other with a high degree of accuracy.

As described above, by using the depth δ/ΔHcJ database 111 and the Dy introduction amount/ΔHcJ database 112, it is possible to obtain distribution of a coercivity increment ΔHcJ regarding a magnet having an arbitrary shape with a high degree of accuracy using a diffusion boundary model illustrated in FIGS. 6 and 8.

It is to be noted that an effect of diffusion from the top face of a flat rectangular parallelepiped magnet may be different from an effect of diffusion from a side face having a smaller area than the top face. Therefore, whether introduction amount distributions from the respective faces may be simply summed up and converted into coercivity increment $\Delta HcJ$ distribution or not was verified. For the verification, a coercivity increment $\Delta HcJ$ at a location 2.0 mm away from a side face, which is an introduction face, and a coercivity increment $\Delta HcJ$ at a depth 2.0 mm away from the top face, which is another introduction face, were actually measured and compared with each other.

Figure 11:
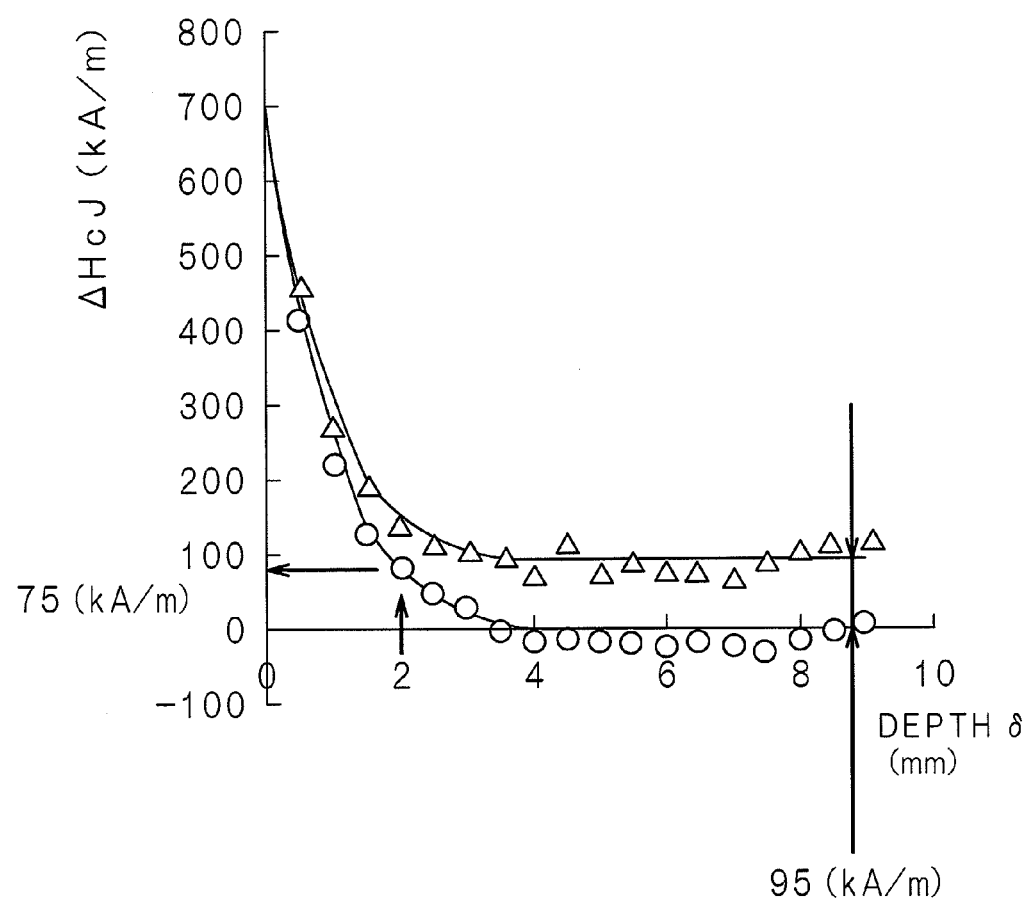
FIG. 11 is a graph illustrating measurement results of coercivity increment ΔHcJ distribution against depth (distance) δ respectively at the center part C and a rim part R of the top face of the magnet.

FIG. 11 is a graph illustrating measurement results of coercivity increment $\Delta HcJ$ distribution against depth (distance) $\delta$ respectively at the center part C and the rim part R of the top face of a magnet. In FIG. 11, the white circles are used to indicate distribution of a coercivity increment $\Delta HcJ$ against depth $\delta$ at the center part C, and the white triangles are used to indicate distribution of a coercivity increment $\Delta HcJ$ against depth $\delta$ at the rim part R. As illustrated in FIG. 11, a coercivity increment $\Delta HcJ$ at a depth $\delta=2.0$ mm at the center part C was approximately 75 (kA/m). On the other hand, a coercivity increment $\Delta HcJ$ at a location having the largest depth $\delta$ at the rim part R 2.0 mm away from a side face (a location receiving a small impact from the top face) was approximately 95 (kA/m). That is, there is only a small difference between a coercivity increment $\Delta HcJ$ at a location 2.0 mm away from the side face and a coercivity increment $\Delta HcJ$ at a depth 2.0 mm away from the top face, which is an introduction face, and an effect of diffusion from the top face and an effect of diffusion from the side face are roughly equal.

This leads to estimates that accuracy can be maintained even in a method of obtaining Dy introduction amount distribution by summing up introduction amount distributions from the respective faces and converting the obtained Dy introduction amount distribution into coercivity increment $\Delta HcJ$ distribution as illustrated in the flow chart of FIG. 2. Accordingly, it is possible in a computation process of a magnetic force characteristic of a case where Dy is diffused into a flat rectangular parallelepiped magnet to obtain coercivity increment $\Delta HcJ$ distribution with a high degree of accuracy by not distinguishing an effect of diffusion from the top face from an effect of diffusion from the side face but summing up Dy introduction amount distributions from the respective faces.

Next, a detailed explanation will be given about a computation process of a J/H curve in the steps S11 and S12. The J/H curve is important information among magnetization curves of a magnet, for specifying a magnetic force characteristic representing a relation between a magnetization intensity J (T) and a magnetic field H (A/M).

Information of a magnetic force characteristic of a magnet, which becomes a base material before diffusion, is stored in the storage unit 11 of the magnetic force characteristic computing device 1. Information of a magnetic force characteristic includes magnetization curves (J/H curve and B/H curve). The operation unit 10 uses a magnetization curve of a base material to obtain a coercivity HcJ at each location based on a coercivity increment $\Delta HcJ$ due to diffusion and computes a J/H curve for each location from the obtained coercivity HcJ. The computed J/H curve is corrected using a stored temperature coefficient of each coercivity, so that a magnetic force characteristic at a high temperature (e.g., 100° C.) is obtained.

Figure 12:
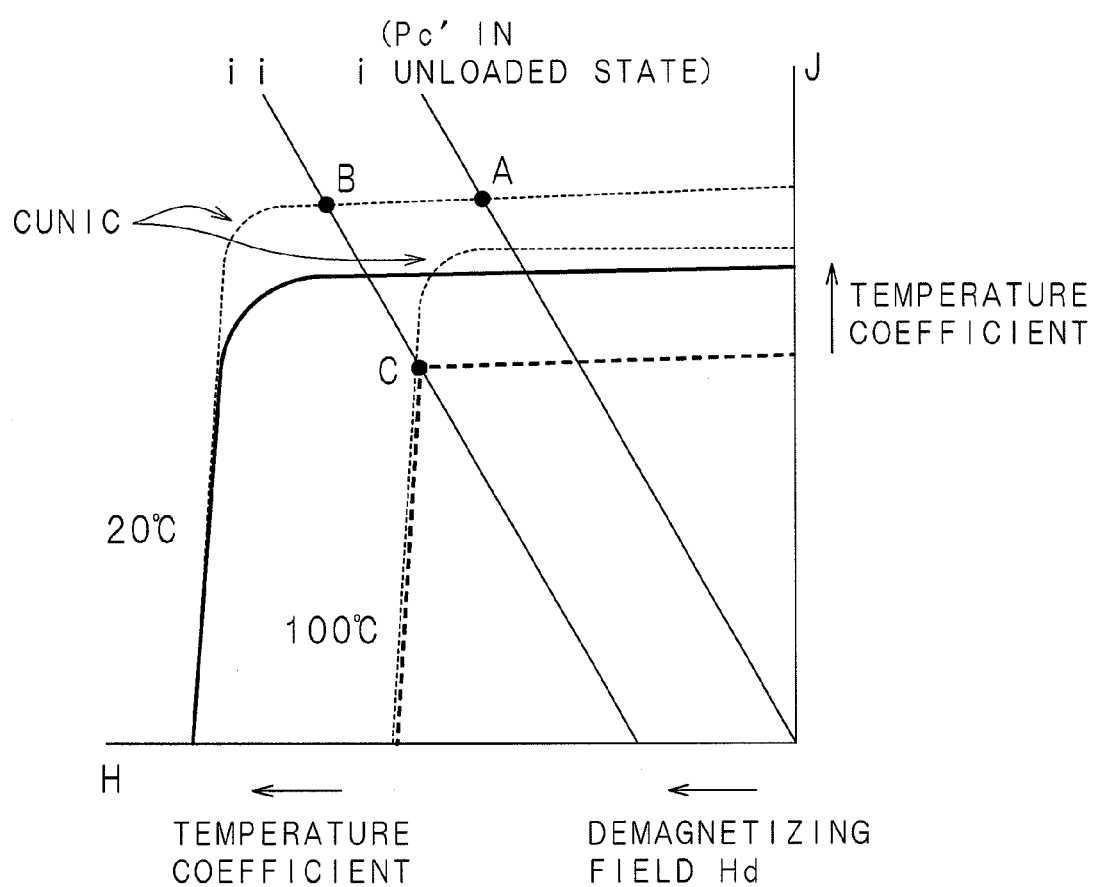
FIG. 12 is a graph illustrating a correction example of a J/H curve.

An explanation will given about a method for correcting a J/H curve of a case where a magnet is heated to 100° C. and loaded and then the temperature is returned to an ordinary temperature (20° C.). FIG. 12 is a graph illustrating a correction example of a J/H curve. The magnetic field H is plotted on the abscissa, while the magnetization intensity J is plotted on the ordinate. The thin broken lines in FIG. 12 are used for expressing J/H curves at an arbitrary location in a magnet after diffusion at 20° C. and 100° C.

A permeance coefficient Pc' (line "i" in FIG. 12) on a J/H curve in an unloaded state is computed by processing of the operation unit 10. It is to be noted that a permeance coefficient here is the permeance coefficient on a J/H curve, and hereinafter the same shall apply. The permeance coefficient Pc' in the unloaded state is determined by the shape of a magnet having a magnetic force characteristic to be computed and the magnetic circuit structure, and an operating point at 20° C. in the unloaded state becomes the point of intersection (A) between the line "i" and a J/H curve at 20° C. The operation unit 10 computes an operating point B of a case where a load is applied at 20° C., translates the line "i" to overlap with the operating point B so as to obtain a line "ii", and computes a demagnetizing field Hd from the line "ii". The operation unit 10 computes an operating point C of a case where a demagnetizing field Hd is applied at 100° C., based on a J/H curve at 100° C. and the line "ii". Since the operating point C exists below an inflection point (Cunic) of the J/H curve at 100° C., it is clear that irreversible demagnetization has occurred. An equivalent J/H curve of a case where a demagnetizing field Hd is applied at 100° C. so that demagnetization occurs is illustrated by the bold broken line in FIG. 12.

A magnetic field H corresponding to a magnetization intensity J, which is zero, on a J/H curve is a coercivity HcJ, and a magnetization intensity J corresponding to a magnetic field H, which is zero, is a remanence Br. The operation unit 10 computes a J/H curve at 20° C. after irreversible demagnetization at 100° C. and HcJ and Br of the equivalent J/H curve (bold broken line in FIG. 12) of a case where a demagnetizing field Hd is applied at 100° C. so that demagnetization occurs, based on the stored information of a temperature coefficient described above. The J/H curve at 20° C. after irreversible demagnetization at 100° C. is illustrated by the bold full line in FIG. 12.

It is to be noted that a coercivity of a Dy diffused magnet is not uniform in a magnet and respective locations have different coercivities as described above. Accordingly, respective locations also have different degrees of lowering of a remanence Br and it is therefore necessary to consider a difference in temperature change of a coercivity for each location in order to obtain a demagnetization characteristic of a magnet with a high degree of accuracy. Accordingly, a temperature coefficient corresponding to a different coercivity (absolute value) is needed.

Figure 13:
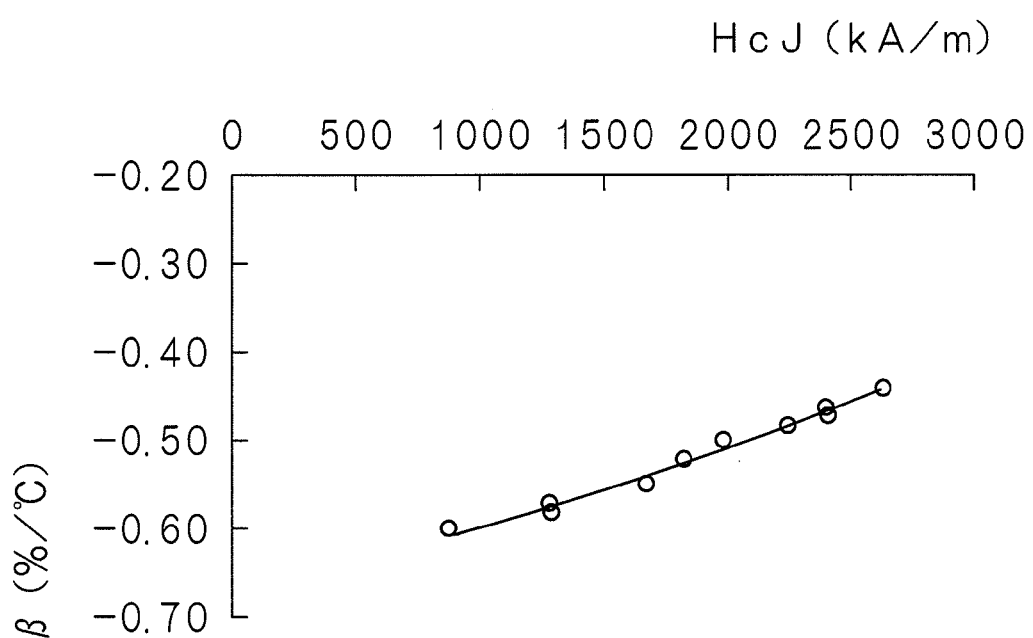
FIG. 13 is a graph illustrating an example of the content of a temperature coefficient of a coercivity preliminarily stored in a storage unit.

FIG. 13 a graph illustrating an example of the content of a temperature coefficient of a coercivity preliminarily stored in the storage unit 11. In FIG. 13, the coercivity (kA/m) is plotted on the abscissa, while the rate β (%1° C.) of change in a coercivity against temperature change is plotted on the ordinate. A quadratic approximation formula, for example, is preliminarily computed for a coercivity HcJ as illustrated by the full line from actual measured values of a coefficient of temperature change at 20° C. to 140° C. indicated by the white circles in FIG. 13, so that a temperature coefficient can be used for an arbitrary coercivity HcJ varying with location in a magnet after Dy diffusion.

In the steps S11 and S12 in the flow chart of FIG. 2, a demagnetization characteristic due to rise in temperature is obtained by correction of a J/H curve using a temperature coefficient. With such a manner, a demagnetizing factor of a case where a load is applied in a state where a magnet after diffusion is heated to 100° C. so that demagnetization occurs can be computed in the step S13. In the computation process in the step S13, it is to be noted that the operation unit 10 converts the J/H curve computed for each location in the step S12 into a B/H curve and computes a demagnetizing factor of the entire magnet by a process based on an existing program for computing the demagnetizing factor.

It is to be noted that it is clear that a magnetizing factor at a different temperature can also be computed by setting the temperature in the step S11 at a temperature other than 100° C., though a demagnetizing factor at 100° C. is obtained by computing a J/H curve at 100° C. in the step S11 and obtaining a J/H curve of a case where a demagnetizing field is applied at 100° C. so that demagnetization occurs and then the temperature lowers to 20° C. in the step S12. A plurality of demagnetizing factors corresponding to different temperatures can be computed and a temperature at which a demagnetizing factor becomes equal to or lower than a specific value can be specified and obtained as a demagnetization characteristic of a magnet after Dy diffusion. The degree of lowering of a remanence due to temperature is important, since an Nd—Fe—B series sintered magnet for use in a motor is often used at a high temperature due to rotation of a motor, an environment around a motor or the like. That is, it is necessary to get information on the limit of temperature at which demagnetization does not occur even in continuous use of the magnet. Accordingly, a demagnetization temperature to be obtained by a magnetic force characteristic computing device 1 according to the present embodiment with a high degree of accuracy is extremely useful information.

As an example of a magnetic force characteristic to be computed as described above, a demagnetization characteristic of each of Nd—Fe—B series magnets (Examples 1 to 3) for use in three kinds of motors was computed. The result of comparison between a computed demagnetization characteristic and an actual measured demagnetization characteristic will be illustrated in the following description.

The following magnet is used as a base material respectively in Examples 1 to 3 in the following explanation. It is to be noted that different shapes are employed respectively in Examples 1 to 3.

NMX-S52 (produced by Hitachi Metals, Ltd., Nd—Fe—B series sintered magnet)
  Remanence Br: 1.46 (T)
  Coercivity HcJ: 901 (kA/m)

Figure 14:
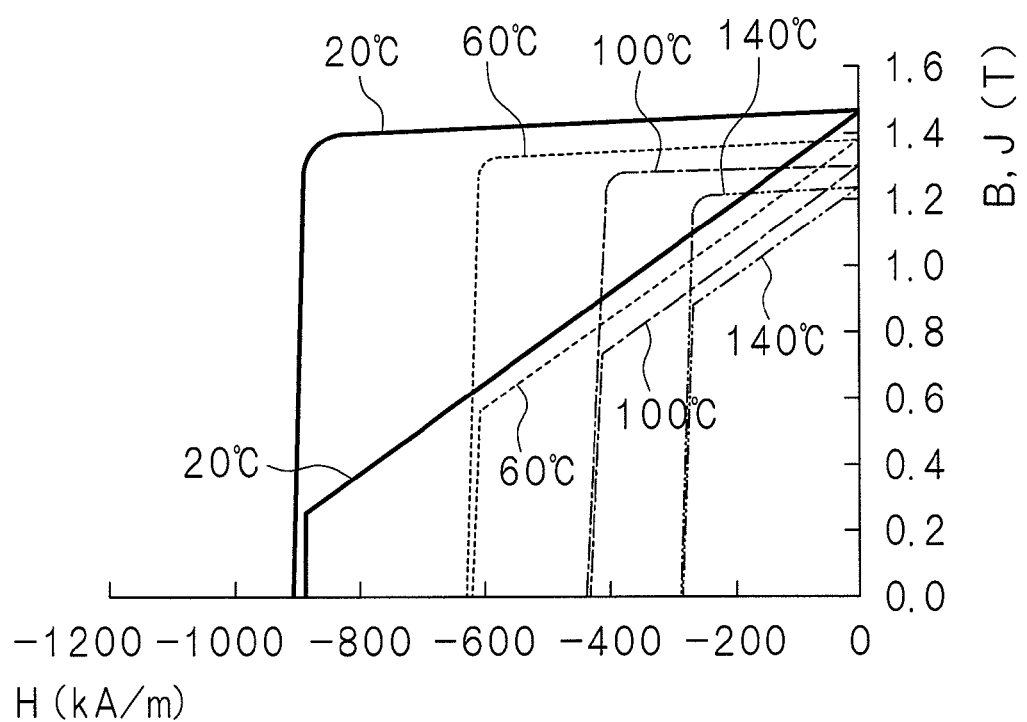
FIG. 14 is a graph illustrating a magnetic force characteristic of a base material of magnets M1 to M3 of Examples 1 to 3.

FIG. 14 is a graph illustrating a magnetic force characteristic of a base material of magnets M1 to M3 of Examples 1 to 3. FIG. 14 includes magnetization curves at 20° C., 60° C., 100° C. and 140° C. The magnetic field H (kA/m) is plotted on the abscissa, while the magnetization intensity B or J (T) is plotted on the ordinate. Upper curves are J/H curves, while lower curves are B/H curves. By preliminarily storing the magnetization curves of a base material illustrated in FIG. 14 in the storage unit 11 of the magnetic force characteristic computing device 1, the operation unit 10 can compute a J/H curve after Dy diffusion and a J/H curve after temperature change as described above.

Figure 15:
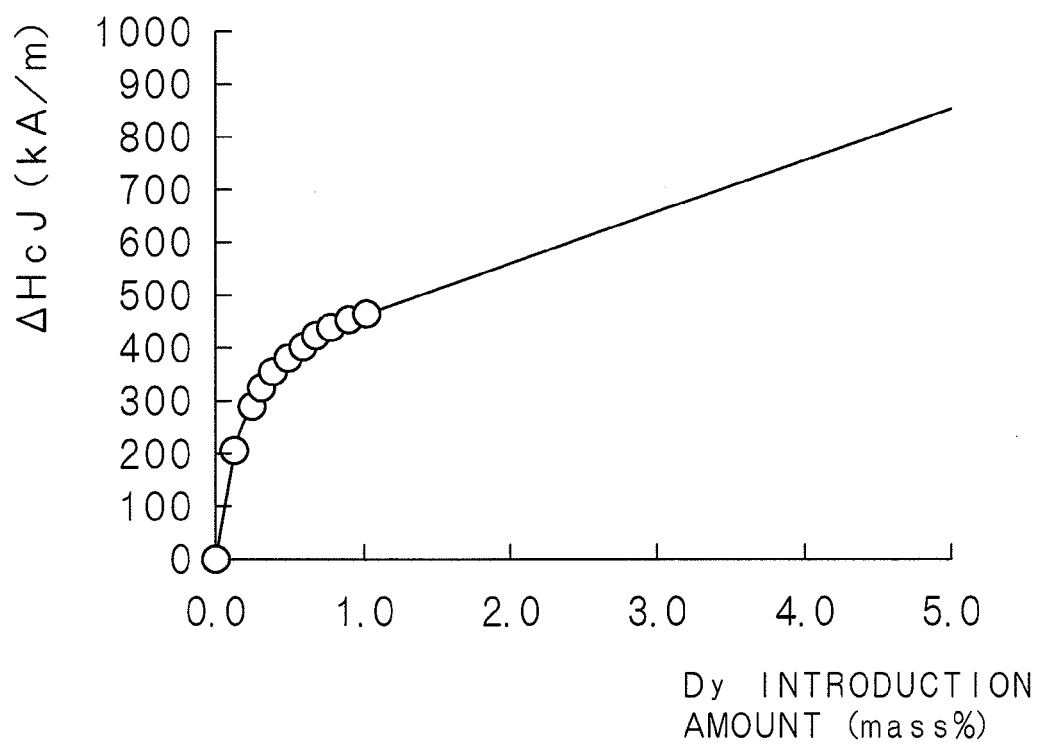
FIG. 15 is a graph illustrating a correspondence between a Dy introduction amount and a coercivity increment ΔHcJ regarding a base material of Examples 1 to 3.

FIG. 15 is a graph illustrating a correspondence between a Dy introduction amount and a coercivity increment ΔHcJ regarding the base material of Examples 1 to 3. The Dy introduction amount (mass %) is plotted on the abscissa, while the coercivity increment ΔHcJ (kA/m) is plotted on the ordinate. The white circles are used to indicate actual measured values and the full line expresses an approximation formula. It is to be noted that illustrations were obtained by cutting out a Dy diffused base material into a strip of a sample having dimensions of 2.8 mm×2.8 mm×1.0 mm and measuring a Dy introduction amount with an ICP. Moreover, ΔHcJ was obtained from a difference between a value of a coercivity HcJ of a sample measured with a VSM and a value of a coercivity HcJ of the base material. As illustrated in FIG. 15, the operation unit 10 can compute ΔHcJ distribution in a magnet as described above by preliminarily storing a corresponding Dy introduction amount/ΔHcJ database 112 in the storage unit 11.

Example 1

As Example 1, a magnetic force characteristic of a magnet for use in a segment magnet type SPM (Surface Permanent Magnet) motor, especially a demagnetizing factor against temperature, was computed and compared with actual measured values. An SPM motor is commonly used in a car industry field such as a part of an EV (Electric Vehicle) or an electric power steering, or for FA (Factory Automation) such as a servomotor, for example.

Figure 16:
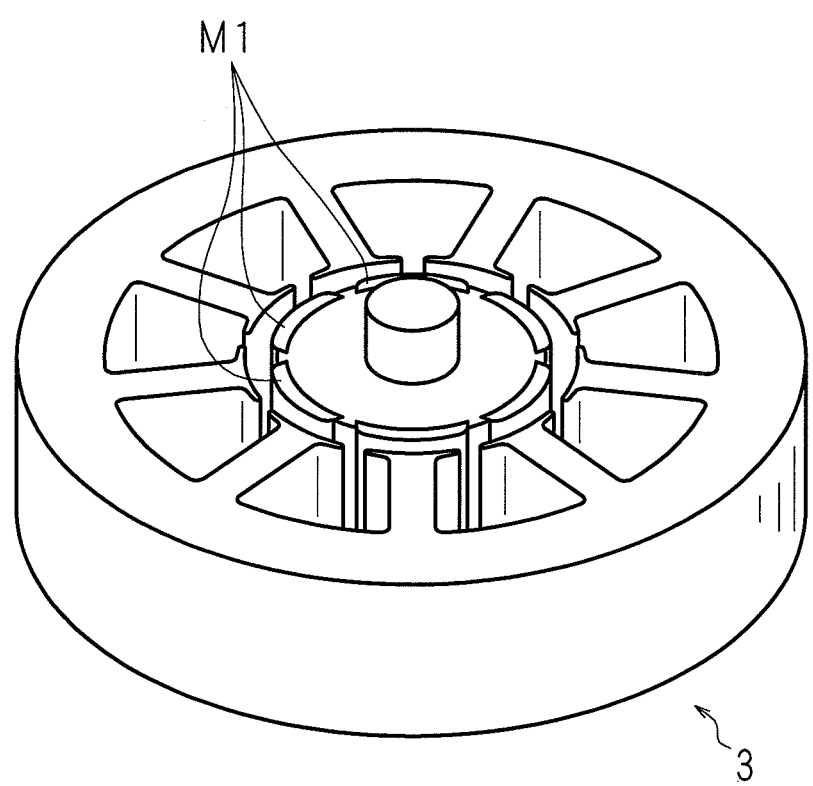
FIG. 16 is a schematic top perspective view of an SPM motor of Example 1.

FIG. 16 is a schematic top perspective view of an SPM motor of Example 1. Denoted at 3 in FIG. 16 is an SPM motor of Example 1, and denoted at M1 are Dy diffused Nd—Fe—B series sintered magnets for use in the SPM motor 3. The SPM motor 3 is a 6-pole 9-slot motor, in which six magnets M1 are arranged on the outer surface of a rotor at regular intervals in a circumferential direction. In Example 1, the magnets M1 respectively have a circular segment shape along the outer surface of the rotor, and the outer surface, i.e., a face opposite to the surface to be bonded with the rotor and side faces along the axial direction of the rotor are Dy introduction faces.

In Example 1, two diffused members A and B having a thickness of 10 mm and different diffusion conditions are prepared as magnets M1 in a method described in Patent Document 1 using rectangular magnets. Respective magnetic force characteristic (demagnetizing factor) of the respective diffused members were computed and compared with actual measurement results. The diffused member A was prepared by setting the treatment temperature at 900° C. and supplying and diffusing Dy for 0.25 hours. The diffused member B was prepared by setting the treatment temperature at 900° C. and diffusing Dy for 1.0 hours.

Needed first is a correspondence relation of depth δ/ΔHcJ of the magnet M1 of the respective cases of the diffused members A and B. FIG. 17 is a graph illustrating actual measured values of a correspondence relation of depth δ/ΔHcJ of the magnet M1 of Example 1. The depth (distance) δ is plotted on the abscissa, while the coercivity increment ΔHcJ is plotted on the ordinate. Here, for measurement of a coercivity HcJ for each depth δ, a plurality of diffused members A and B were respectively prepared to have a measurement pitch of 0.5 mm, the respective magnets were cut out into a strip having dimensions of 2.8 mm×2.8 mm×1.0 mm, and a coercivity HcJ was measured for each location with a VSM. It is to be noted that a depth δ is the position of a strip from an introduction face (side face) seen from the top face of the magnet M1. It is to be noted that the circles in FIG. 17 are used to indicate the correspondence relation of depth δ/ΔHcJ of the magnet M1, which is the diffused member A, and the triangles are used to indicate the correspondence relation of depth δ/ΔHcJ of the magnet M1, which is the diffused member B. The full lines are the respective approximate curves and both are expressed by the following approximation formula (1).

$$\Delta HcJ(\delta) = a \cdot EXP(b \cdot \delta) \quad (1)$$

In Example 1, the coefficients "a" and "b" of the approximation formula (1) expressing an approximate curve for the respective cases of the diffused members A and B are identified and preliminarily stored as the content corresponding to the $\delta/\Delta HcJ$ database 111. Regarding the diffused member A, a=730 and b=−2.098 were satisfied. Regarding the diffused member B, a=841 and b=−0.892 were satisfied.

In the graph illustrated in FIG. 17, the coefficients of the approximation formula could be identified by actual measured values up to a depth $\delta=10$ mm. However, a coercivity increment $\Delta HcJ$ for a sufficient depth $\delta$ sometimes cannot be actually measured when a thin magnet is used. In such a case, the coefficients "a" and "b" of the approximation formula (1) can be obtained by measuring a coercivity increment $\Delta HcJ$ up to the thickness and then applying the measured values to a diffusion model based on the Neumann boundary condition as illustrated in FIG. 6.

FIG. 18 is a graph illustrating a result of comparison between actual measured values and computation results of $\delta/\Delta HcJ$ regarding the magnet M1 of Example 1. The depth (distance) $\delta$ is plotted on the abscissa, while the coercivity increment $\Delta HcJ$ is plotted on the ordinate. The white circles are used to indicate actual measured values of a coercivity increment $\Delta HcJ$ at each depth $\delta$ of the magnet M1, which is the diffused member A, and the black circles are used to indicate computation results of a coercivity increment $\Delta HcJ$ to be obtained by the approximation formula (1) (a=730, b=−2.098) for the magnet M1, which is the diffused member A. Moreover, the white triangles are used to indicate actual measured values of a coercivity increment $\Delta HcJ$ at each depth $\delta$ of the magnet M1, which is the diffused member B, and the black triangles are used to indicate computation results of a coercivity increment $\Delta HcJ$ to be obtained by the approximation formula (1) (a=841, b=−0.892) for the magnet M1, which is the diffused member B.

As illustrated in FIG. 18, the approximation formula (1) reproduces actual measured values satisfactorily and it is therefore possible to obtain a characteristic of $\delta/\Delta HcJ$ against thickness of a magnet with a high degree of accuracy by using the $\delta/\Delta HcJ$ database 111 for a sufficient depth $\delta$, even without actually measuring a $\delta/\Delta HcJ$ characteristic for a number of thicknesses of a magnet.

FIG. 19 is a schematic diagram for schematically illustrating an example of $\Delta HcJ$ distribution computed regarding the magnet M1 of Example 1. An example of $\Delta HcJ$ distribution of the diffused member A is illustrated on the left side, and that of the diffused member B is illustrated on the right side. In both cases, distribution is illustrated on a sectional view to be obtained by cutting away the magnet M1 so that the magnet M1 is divided in half along a plane perpendicular to the shaft of the SPM motor 3. As described above, a face (top face in FIG. 19) opposite to a face of the magnet M1 to be bonded with the rotor and side faces (both side faces in FIG. 19) in the axial direction are Dy introduction faces. Accordingly, a coercivity increment $\Delta HcJ$ in the magnet M1 is distributed to be large at the upper part and at the both side parts and decrease towards the center of the face to be bonded with the rotor.

Figure 20:
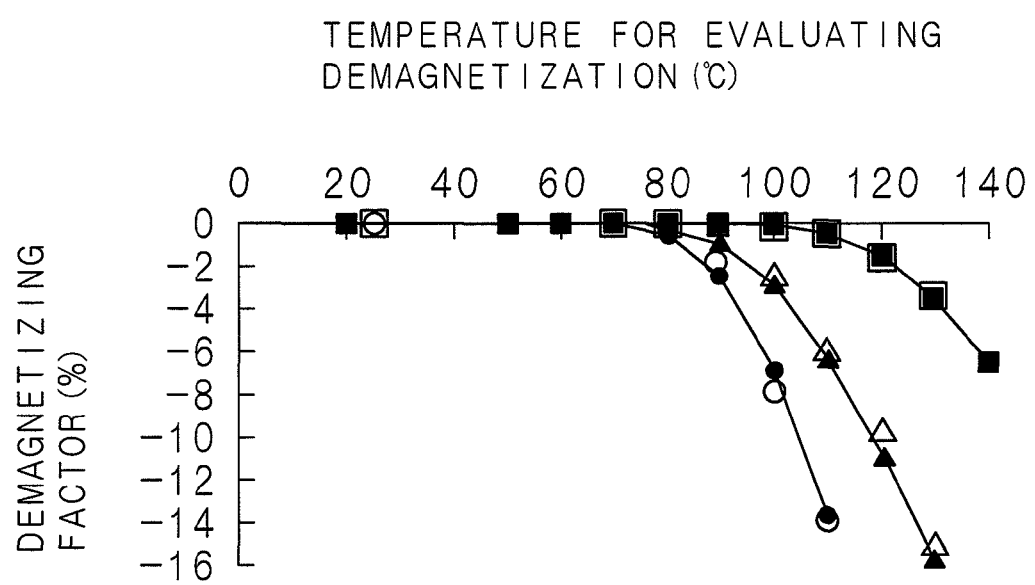
FIG. 20 is a graph illustrating an example of comparison between computation results and actual measurement results of a demagnetization characteristic of an SPM motor provided with the magnet of Example 1 having the ΔHcJ distribution illustrated in FIG. 19.

FIG. 20 is a graph illustrating an example of comparison between computation results and actual measurement results of a demagnetization characteristic of the SPM motor 3 provided with the magnet M1 of Example 1 having the $\Delta HcJ$ distribution illustrated in FIG. 19. It is to be noted that a demagnetizing factor was computed from a rate of decrease in torque. In FIG. 20, the temperature (° C.) for evaluating a demagnetizing factor is plotted on the abscissa, while the demagnetizing factor (%) is plotted on the ordinate. The white circles are used to indicate actual measured values of a demagnetizing factor against different temperatures of a base material before Dy diffusion treatment, and the black circles are used to indicate computed values thereof. The white triangles are used to indicate actual measured values of a demagnetizing factor of the magnet M1, which is the diffused member A, and the black triangles are used to indicate computed values thereof. The white quadrangles are used to indicate actual measured values of a demagnetizing factor of the magnet M1, which is the diffused member B, and the black quadrangles are used to indicate computed values thereof.

It is to be noted that a demagnetizing factor was obtained by causing the SPM motor 3 provided with a magnet M1 to operate in a thermostatic bath at a preset temperature, returning the temperature to an ordinary temperature, measuring a torque in an ordinary temperature state and computing a rate of decrease from a torque at an ordinary temperature obtained before applying a load. It is to be noted that the temperature of the thermostatic bath was set at every 10° C. from 50° C. to 140° C. as illustrated in FIG. 20 and the SPM motor 3 was rotated at the respective preset temperatures.

By focusing on a preset temperature at which a demagnetizing factor became 2% in the computation results and actual measurement results of a demagnetizing factor illustrated in FIG. 20, the following fact is to be understood. An actual measured value of a temperature at which a demagnetizing factor of a base material became 2% was 91° C. and a computation result thereof was 88°, which had an error of −3° C. An actual measured value of a temperature at which a demagnetizing factor of the magnet M1 constituted of the diffused member A became 2% was 98° C. and a computation result thereof was 96° C., which had an error of −2° C. An actual measured value of a temperature at which a demagnetizing factor of the magnet M1 constituted of the diffused member B became 2% was 122° C. and a computation result thereof was 122° C., which had an error of zero. It is to be understood that heat resistance of demagnetization of the magnet M1 was enhanced by Dy diffusion. This shows that a demagnetization characteristic could be analyzed with a satisfactory degree of accuracy.

Figure 21:
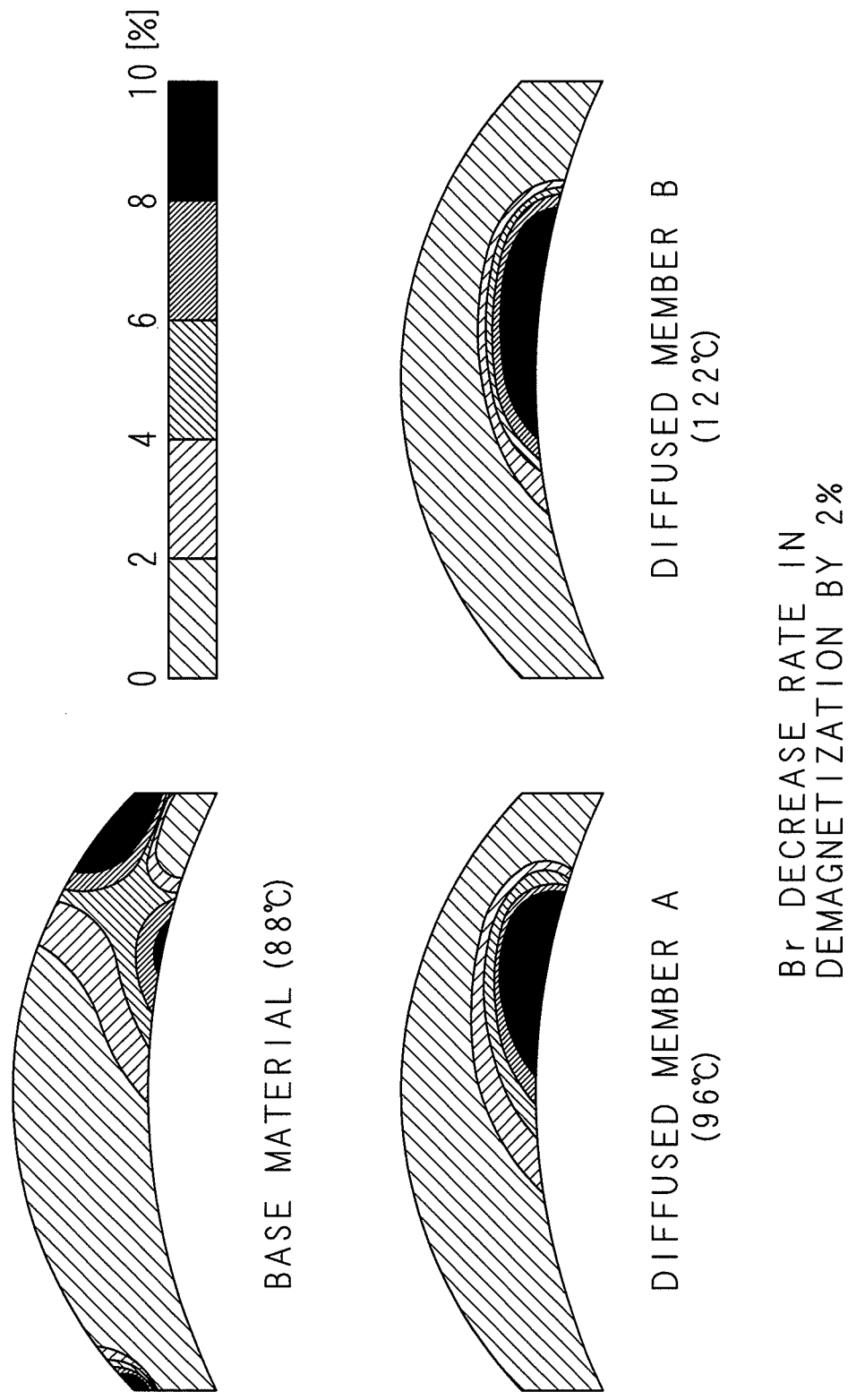
FIG. 21 is a schematic diagram for schematically illustrating a computation result of distribution of a Br decrease rate at a temperature at which the magnet of Example 1 having the ΔHcJ distribution illustrated in FIG. 19 is demagnetized by 2%.

FIG. 21 is a schematic diagram for schematically illustrating a computation result of distribution of a Br decrease rate at a temperature at which a magnet M1 of Example 1 having the $\Delta HcJ$ distribution illustrated in FIG. 19 is demagnetized by 2%. An example of a base material is illustrated at a left upper part of FIG. 21, an example of the diffused member A is illustrated at a left lower part, and an example of the diffused member B is illustrated at a right lower part. In all cases, distribution is illustrated on a sectional view to be obtained by cutting away the magnet M1 along a plane perpendicular to the shaft of the SPM motor 3 as is the case with FIG. 19. As described above, a demagnetizing factor of the base material becomes 2% at 88° C. Though a base material has uniform distribution of a coercivity, a demagnetizing factor has such distribution that the demagnetizing factor tends to be larger and the Br decrease rate tends to be higher at the outer side of the SPM motor 3. It became clear from computation that a demagnetizing factor of the diffused member A and that of the diffused member B become 2% respectively at 96° C. and 122° C. Regarding the Br decrease rate at this time, a demagnetizing factor tends to be low at a location having a large coercivity increment illustrated in FIG. 19 and high at a location having a small coercivity increment. Here, it is to be noted that a demagnetizing factor was computed from a Br decrease amount obtained by heating the diffused member A and the diffused member B respectively to 96° C. and 122° C., applying a magnetizing field, and then returning the temperature to a room temperature (approximately 20° C.).

Example 2

As Example 2, a magnetic force characteristic of a magnet for use in an IPM (Interior Permanent Magnet) motor, especially a demagnetizing factor against temperature, was computed and compared with actual measurements. An IPM motor is applied to an EV (Electric Vehicle), an HEV (Hybrid EV), an air conditioner, an industrial large motor, a tramcar motor and the like.

Figure 22:
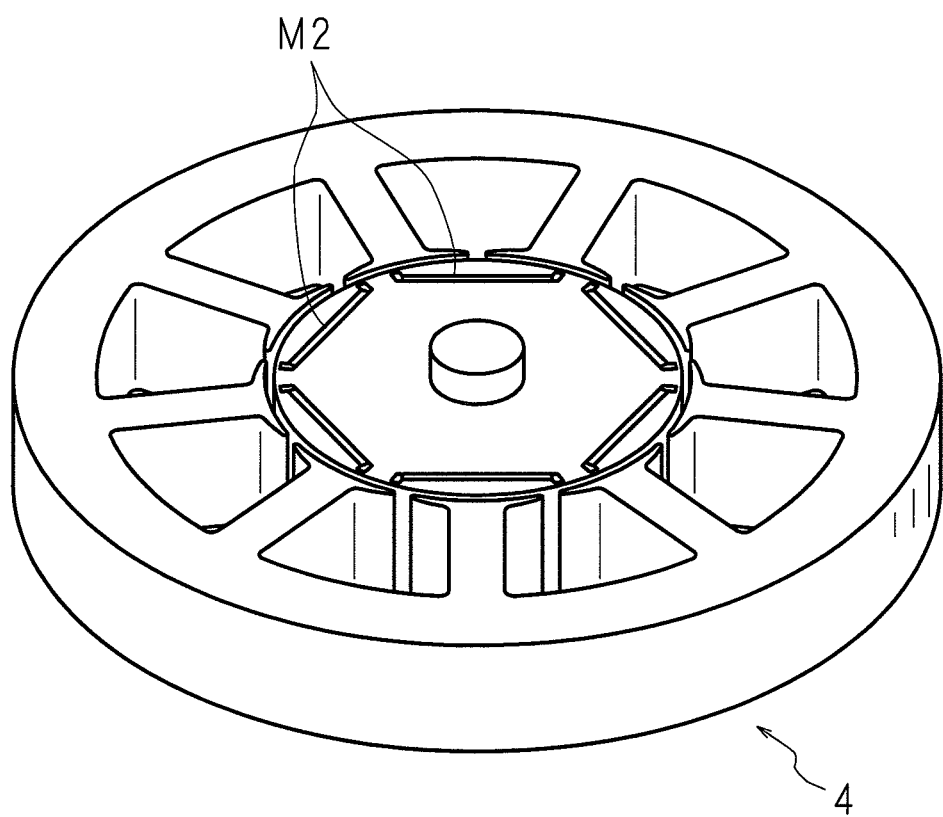
FIG. 22 is a schematic top perspective view of an IPM motor of Example 2.

FIG. 22 is a schematic top perspective view of an IPM motor of Example 2. Denoted at 4 in FIG. 22 is an IPM motor of Example 2, and denoted at M2 are Dy diffused Nd—Fe—B series sintered magnets for use in the IPM motor 4. The IPM motor 4 is a 6-pole 9-slot motor, in which six magnets M2 having a flat plate shape are set in a rotor in a rotational symmetry manner around the shaft of the motor. In Example 2, the magnets M1 respectively have a flat plate shape, and the outer surface of the IPM motor 4 and side faces along the axial direction of the motor are Dy introduction faces.

In Example 2, two diffused members C and D having different diffusion conditions were prepared as magnets M2 in a method described in WO 2007/102391. A magnetic force characteristic (demagnetizing factor) of the respective diffused members were computed and compared with actual measurement results. The diffused member C was prepared by setting the treatment temperature at 900° C. and supplying and diffusing Dy for 2.0 hours. The diffused member D was prepared by setting the treatment temperature at 900° C. and supplying and diffusing Dy for 4.0 hours.

Figure 23:
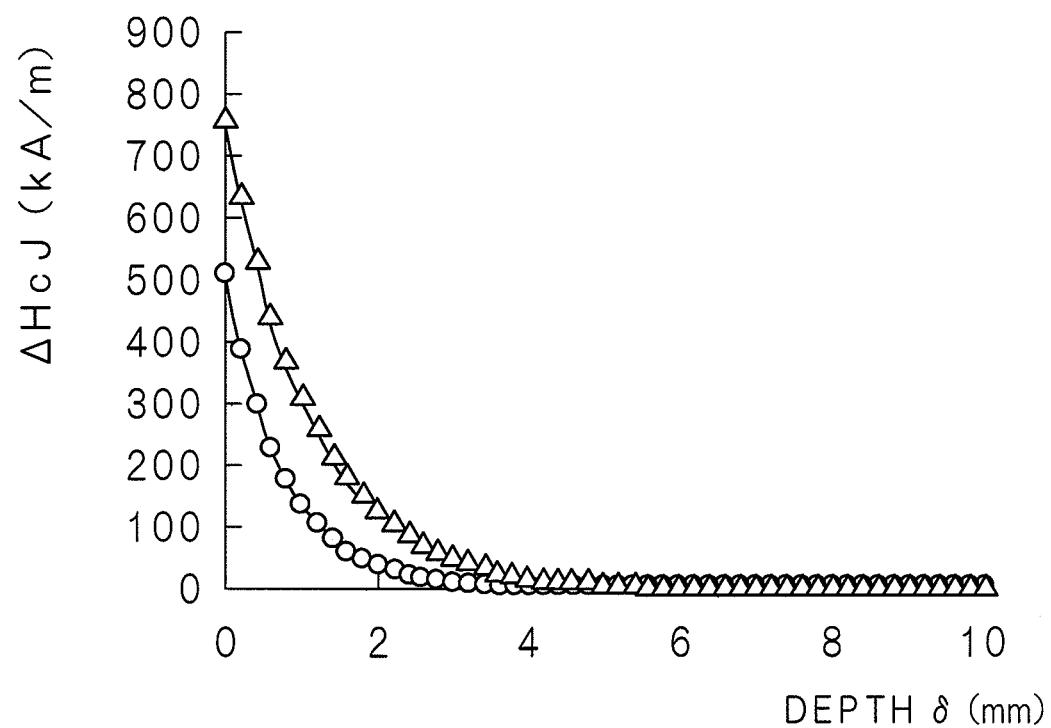
FIG. 23 is a graph illustrating actual measured values of a correspondence relation of depth δ/ΔHcJ of a magnet of Example 2.

Needed first is a correspondence relation of depth δ/ΔHcJ of a magnet M2 of the respective cases of the diffused members C and D. FIG. 23 is a graph illustrating actual measured values of a correspondence relation of depth δ/ΔHcJ of the magnet M2 of Example 2. The depth (distance) δ is plotted on the abscissa, while the coercivity increment ΔHcJ is plotted on the ordinate. A coercivity HcJ was measured in the same manner as Example 1. The circles are used to indicate the correspondence relation of depth δ/ΔHcJ of the magnet M2, which is the diffused member C, and the triangles are used to indicate the correspondence relation of depth δ/ΔHcJ of the magnet M2, which is the diffused member D. The full lines are the respective approximate curves and both are expressed by the above approximation formula (1).

In Example 2, the coefficients "a" and "b" of the approximation formula (1) expressing an approximate curve for the respective cases where the diffused members C and D were used are identified and preliminarily stored as the content corresponding to the δ/ΔHcJ database 111. In a case where the diffused member C was used, a=507 and b=−1.326 were satisfied. In a case where the diffused member D was used, a=763 and b=−0.888 were satisfied. Here, when a coercivity increment ΔHcJ against sufficient depth δ cannot be actually measured, application to a diffusion model based on the Neumann boundary condition is performed as illustrated in FIG. 6 and the coefficients "a" and "b" of the approximation formula (1), which is obtained by approximating a curve obtained as a result, can also be obtained as is the case with Example 1.

Figure 24:
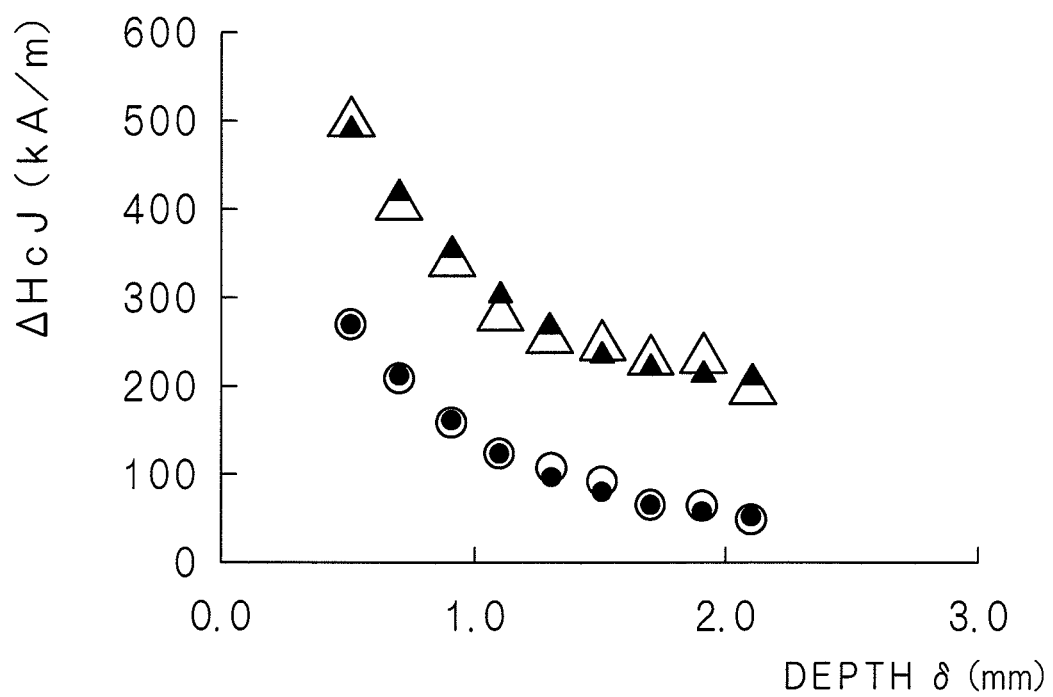
FIG. 24 is a graph illustrating a result of comparison between actual measured values and computed results of δ/ΔHcJ regarding the magnet of Example 2.

FIG. 24 is a graph illustrating a result of comparison between actual measured values and computation results of δ/ΔHcJ regarding the magnet M2 of Example 2. The depth (distance) δ is plotted on the abscissa, while the coercivity increment ΔHcJ is plotted on the ordinate. The white circles are used to indicate actual measured values of a coercivity increment ΔHcJ at each depth δ of the magnet M2, which is the diffused member C, and the black circles are used to indicate computation results of a coercivity increment ΔHcJ to be obtained by the approximation formula (1) (a=507, b=−1.326) for the magnet M2, which is the diffused member C. Moreover, the white triangles are used to indicate actual measured values of a coercivity increment ΔHcJ at each depth δ of the magnet M2, which is the diffused member D, and the black triangles are used to indicate computation results of a coercivity increment ΔHcJ to be obtained by the approximation formula (1) (a=763, b=−0.888) for the magnet M2, which is the diffused member D. In Example 2, the approximation formula (1) also reproduces actual measured values satisfactorily.

FIG. 25 is a schematic diagram for schematically illustrating an example of ΔHcJ distribution computed regarding the magnet M2 of Example 2. An example of ΔHcJ distribution of the diffused member C is illustrated on the left side, and that of the diffused member D is illustrated on the right side. In both cases, distribution is illustrated on a sectional view to be obtained by cutting away the magnet M2 so that the magnet M2 is divided in half along a plane perpendicular to the shaft of the IPM motor 4. As described above, an outer wide face (top face in FIG. 25) of the IPM motor 4 and side faces (both side faces in FIG. 25) in the axial direction are Dy introduction faces of the magnet M2. Accordingly, computation shows that a coercivity increment ΔHcJ in the magnet M2 is distributed to be large at the upper part and at the both side parts and decrease towards the center side of the IPM motor 4.

FIG. 26 is a graph illustrating an example of comparison between computation results and actual measurement results of a demagnetization characteristic of the IPM motor 4 provided with the magnet M2 of Example 2 having the ΔHcJ distribution illustrated in FIG. 25. It is to be noted that a demagnetizing factor was computed from a rate of decrease in torque. This is similar to the case where the SPM motor provided with the magnet M1 of Example 1 is used. In FIG. 26, the temperature (° C.) for evaluating a demagnetizing factor is plotted on the abscissa, while the demagnetizing factor (%) is plotted on the ordinate. The white circles are used to indicate actual measured values of a demagnetizing factor against different temperatures of a base material before Dy diffusion treatment, and the black circles are used to indicate computed values thereof. The white triangles are used to indicate actual measured values of a demagnetizing factor of the magnet M2, which is the diffused member C, and the black triangles are used to indicate computed values thereof. The white quadrangles are used to indicate actual measured values of a demagnetizing factor of the magnet M2, which is the diffused member D, and the black quadrangles are used to indicate computed values thereof. Since the method for measuring a demagnetizing factor is similar to that of Example 1, a detailed explanation thereof will be omitted here.

By focusing on a preset temperature at which a demagnetizing factor became 2%, the following fact is to be understood as is the case with Example 1. An actual measured value of a temperature at which a demagnetizing factor of the base material became 2% was 93° C. and a computation result thereof was 91°, which had an error of −2° C. An actual measured value of a temperature at which a demagnetizing factor of the magnet M2, which was the diffused member C, became 2% was 107° C. and a computation result thereof was 102° C., which had an error of −5° C. An actual measured value of a temperature at which a demagnetizing factor of the magnet M2, which was the diffused member D, became 2% was 114° C. and a computation result thereof was 117° C., which had an error of −3° C. This shows that a demagnetization characteristic could be analyzed with a satisfactory degree of accuracy. Moreover, it is to be understood that heat resistance of demagnetization of the magnet M2 was also enhanced by Dy diffusion in Example 2.

Figure 27:
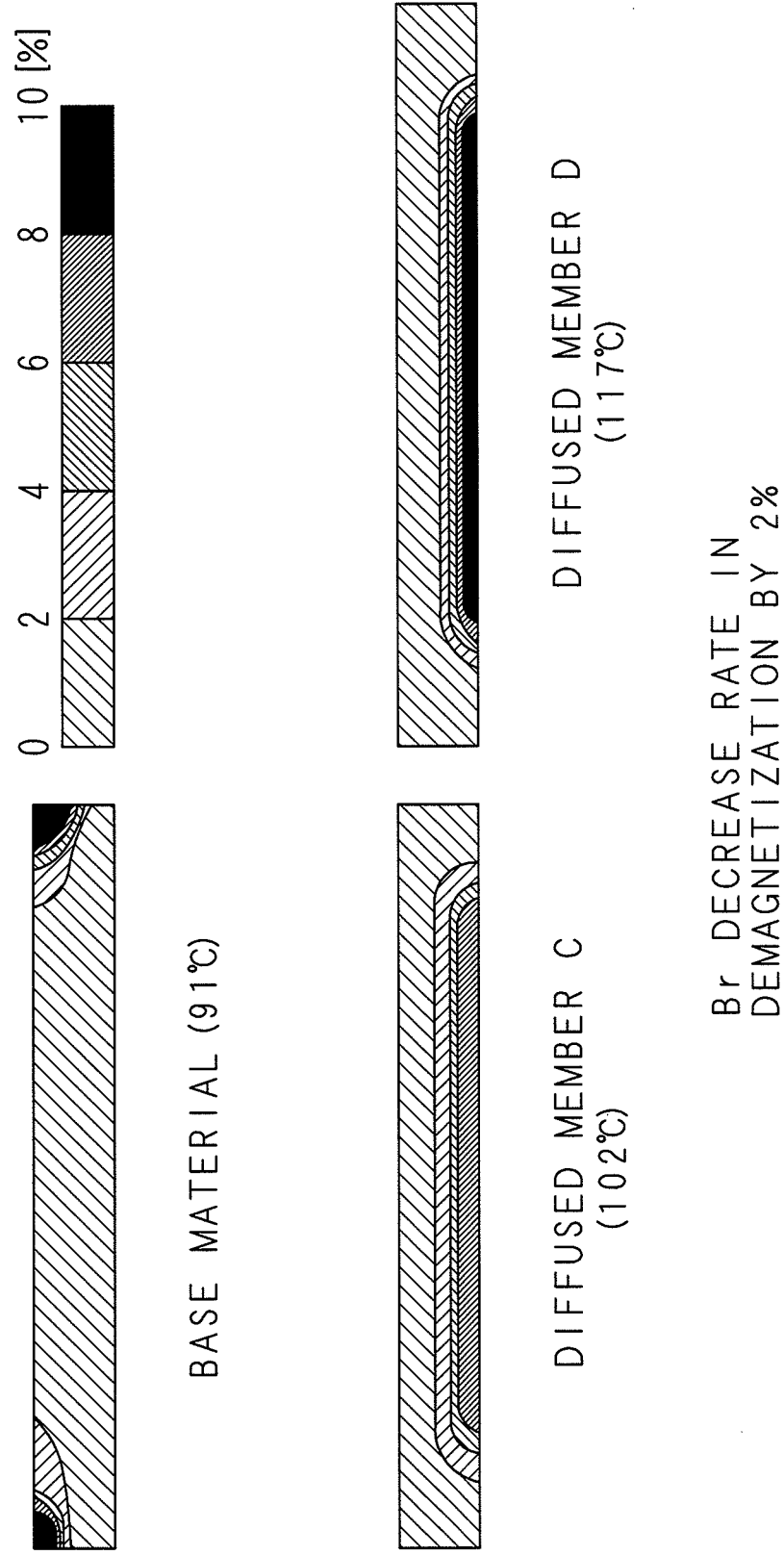
FIG. 27 is a schematic diagram for schematically illustrating a computation result of distribution of a Br decrease rate at a temperature at which the magnet of Example 2 having the ΔHcJ distribution illustrated in FIG. 25 is demagnetized by 2%.

FIG. 27 is a schematic diagram for schematically illustrating a computation result of distribution of a Br decrease rate at a temperature at which the magnet M2 of Example 2 having the ΔHcJ distribution illustrated in FIG. 25 is demagnetized by 2%. An example of the base material is illustrated at a left upper part of FIG. 27, an example of the diffused member C is illustrated at a left lower part, and an example of the diffused member D is illustrated at a right lower part. In all cases, distribution is illustrated on a sectional view to be obtained by cutting away the magnet M2 along a plane perpendicular to the shaft of the IPM motor 4 as is the case with FIG. 25. As described above, computation shows that a demagnetizing factor of the base material became 2% at 91° C. Though a base material has uniform distribution of a coercivity, a demagnetizing factor has such distribution that the largest demagnetizing factor is obtained and the Br decrease rate is high at the outer corner parts of the IPM motor 4. It became clear from computation that a demagnetizing factor of the diffused member C and that of the diffused member D become 2% respectively at 102° C. and 117° C. Regarding the Br decrease rate of the magnet M2 after Dy diffusion, a demagnetizing factor tends to be low at a location having a large coercivity increment illustrated in FIG. 25 and high at a location having a small coercivity increment. Example 2 was obtained in the same manner as Example 1.

Example 3

As Example 3, a magnetic force characteristic of a magnet for use in an IPM motor, especially a demagnetizing factor against temperature, was computed and compared with actual measurements. A motor of Example 3 is characterized in that magnets are arranged in a V shape, in comparison with Example 2. The following description will explain an example wherein a change in a magnetic force characteristic due to the arrangement is computed and compared with actual measurements.

Figure 28:
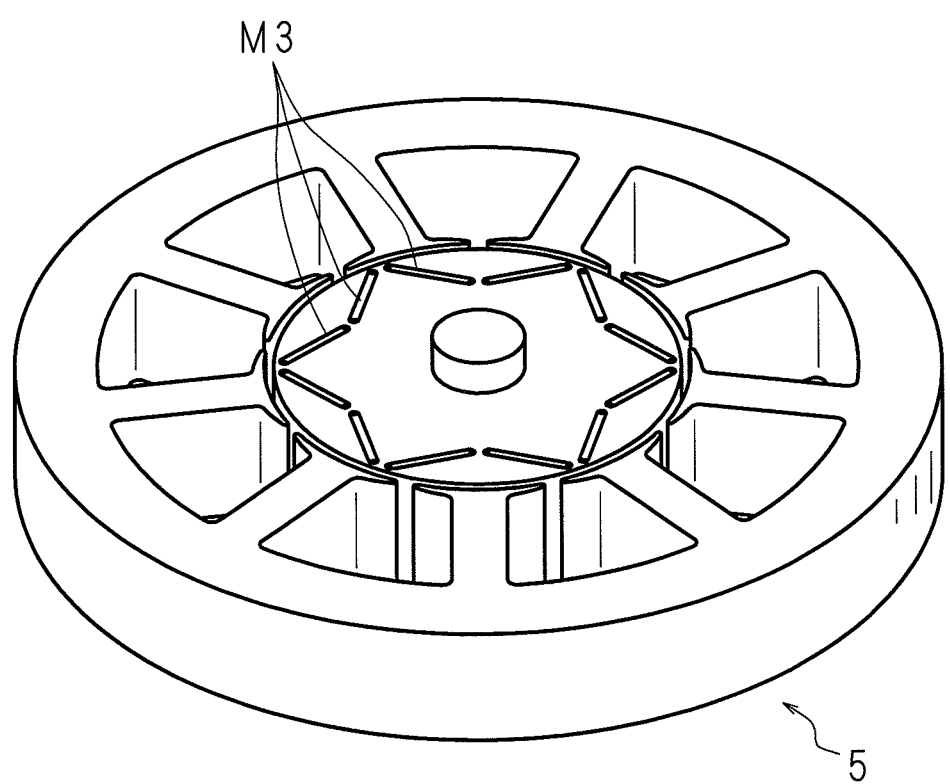
FIG. 28 is a schematic top perspective view of an IPM motor of Example 3.

FIG. 28 is a schematic top perspective view of an IPM motor of Example 3. Denoted at 5 in FIG. 28 is an IPM motor of Example 3, and denoted at M3 are Dy diffused Nd—Fe—B series sintered magnets for use in the IPM motor 5. The IPM motor 5 has a structure wherein the magnets M2 in the IPM motor 4 of Example 2 are respectively divided in half with a line parallel to the motor shaft and set in a rotor to be arranged in a V shape. The magnets M3 respectively have a flat plate shape. The outer surface of the IPM motor 5 and side faces along the axial direction are Dy introduction faces of the respective magnets M3.

Figure 29:
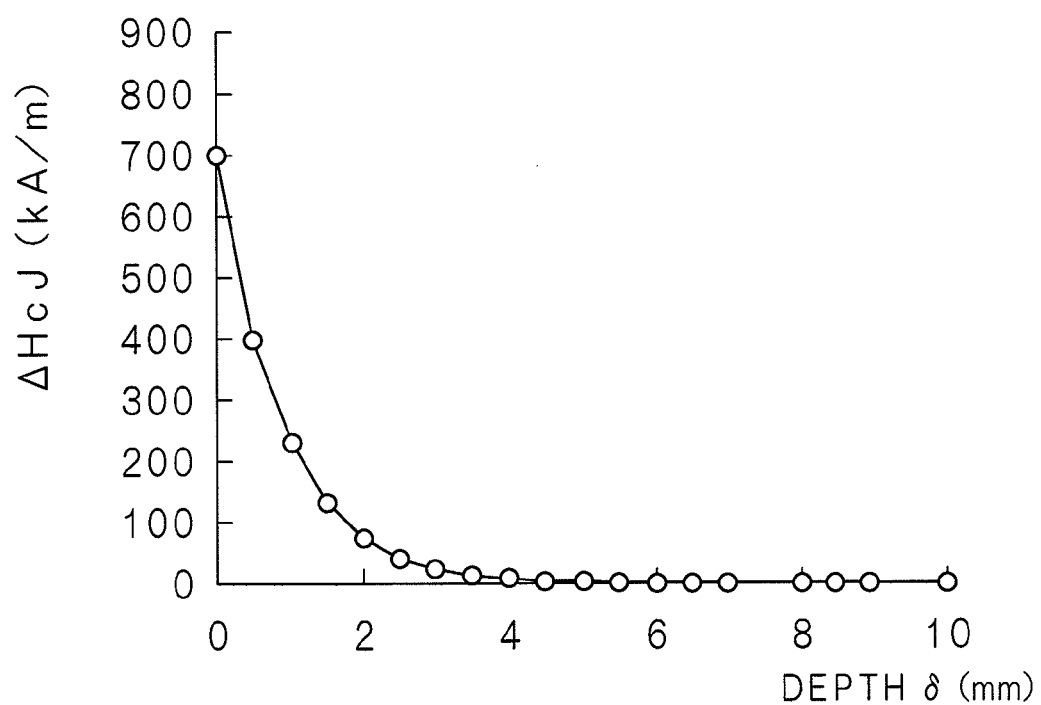
FIG. 29 is a graph illustrating actual measured values of a correspondence relation of depth δ/ΔHcJ of a magnet of Example 3.

In Example 3, a diffused member E was prepared as the magnet M3 in a method described in Patent Document 1 by setting the treatment temperature at 900° C. and supplying and diffusing Dy for 4.0 hours. Needed first is a correspondence relation of depth δ/ΔHcJ of the magnet M3, which is the diffused member E, as is the case with Examples 1 and 2. FIG. 29 is a graph illustrating actual measured values of a correspondence relation of depth δ/ΔHcJ of the magnet M3 of Example 3. The depth (distance) δ is plotted on the abscissa, while the coercivity increment ΔHcJ is plotted on the ordinate. A coercivity HcJ is measured in the same manner as Example 1. The circles are used to indicate the correspondence relation of depth δ/ΔHcJ of the magnet M3, which is the diffused member E. The full line is an approximate curve and is expressed by the above approximation formula (1).

In Example 3, the coefficients "a" and "b" of the approximation formula (1) expressing an approximate curve of the magnet M3 are identified from actual measured values and preliminarily stored as the content corresponding to the δ/ΔHcJ database 111. In the case of the magnet M3 in Example 3, a=705 and b=−1.120 were satisfied. Here, when a coercivity increment ΔHcJ against sufficient depth δ cannot be actually measured, application to a diffusion model based on the Neumann boundary condition is performed as illustrated in FIG. 6 and the coefficients "a" and "b" of the approximation formula (1) can also be obtained as is the case with Example 1.

Figure 30:
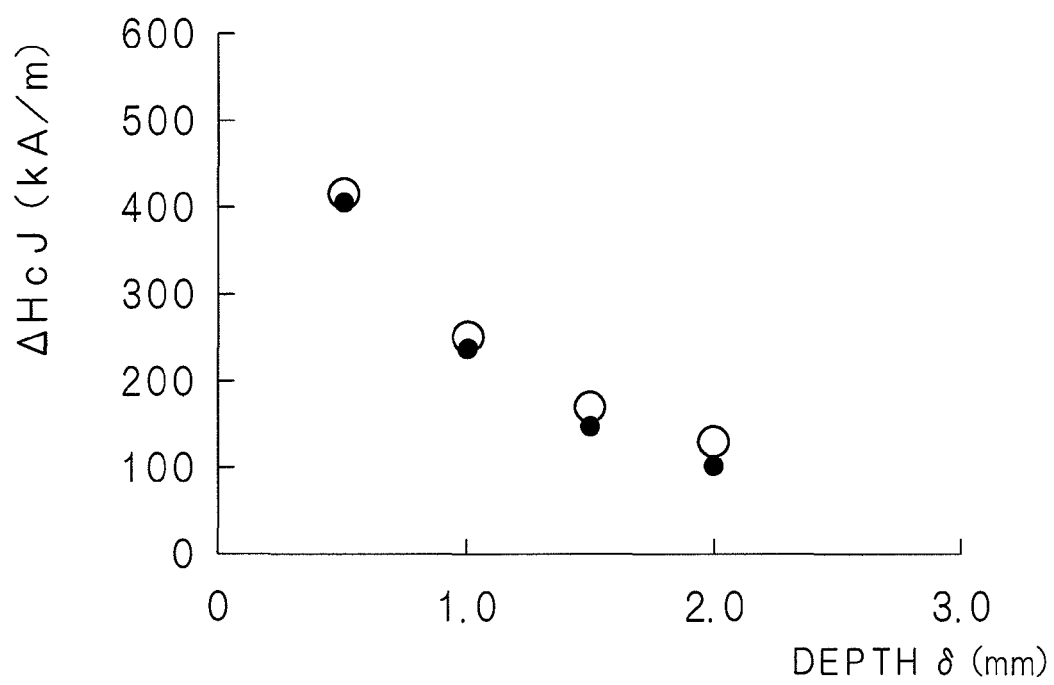
FIG. 30 is a graph illustrating a result of comparison between actual measured values and computation results of δ/ΔHcJ regarding the magnet of Example 3.

FIG. 30 is a graph illustrating a result of comparison between actual measured values and computation results of δ/ΔHcJ regarding the magnet M3 of Example 3. The depth (distance) δ is plotted on the abscissa, while the coercivity increment ΔHcJ is plotted on the ordinate. The white circles are used to indicate actual measured values of a coercivity increment ΔHcJ at each depth δ of the magnet M3, which is the diffused member E, and the black circles are used to indicate computation results of a coercivity increment ΔHcJ to be obtained by the approximation formula (1) (a=705, b=−1.120) for the magnet M3, which is the diffused member E. In Example 3, the approximation formula (1) also reproduces actual measured values satisfactorily.

FIG. 31 is a schematic diagram for schematically illustrating an example of ΔHcJ distribution computed regarding the magnet M3 of Example 3. In the example illustrated in FIG. 31, distribution is illustrated on a sectional view to be obtained by cutting away a pair of magnets M3, M3 so that the magnets M3 are divided in half along a plane perpendicular to the shaft of the IPM motor 5. As described above, the outer surface (top face in FIG. 31) of the IPM motor 5 and side faces (both side faces in FIG. 31) in the axial direction are Dy introduction faces of each magnet M3. Accordingly, computation shows that a coercivity increment ΔHcJ in the magnet M3 is distributed to be large at the outer surface side of the IPM motor 5 and at the side face side in the axial direction in each magnet M3 and decrease towards the center side of the IPM motor 5.

Figure 32:
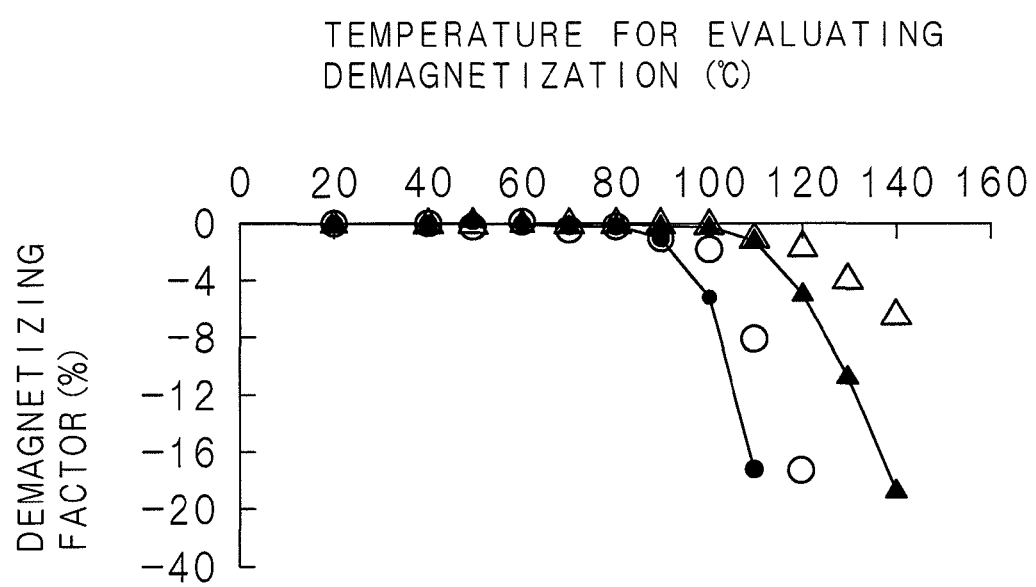
FIG. 32 is a graph illustrating an example of comparison between computation results and actual measurement results of a demagnetization characteristic of an IPM motor provided with a magnet of Example 3 having the ΔHcJ distribution illustrated in FIG. 31.

FIG. 32 is a graph illustrating an example of comparison between computation results and actual measurement results of a demagnetization characteristic of the IPM motor 5 provided with the magnet M3 of Example 3 having the ΔHcJ distribution illustrated in FIG. 31. It is to be noted that a demagnetizing factor was computed from a rate of decrease in torque. In FIG. 32, the temperature (° C.) for evaluating a demagnetizing factor is plotted on the abscissa, while the demagnetizing factor (%) is plotted on the ordinate. The white circles are used to indicate actual measured values of a demagnetizing factor against different temperatures of a base material before Dy diffusion treatment, and the black circles are used to indicate computed values thereof. The white triangles are used to indicate actual measured values of a demagnetizing factor of the magnet M3, which is the diffused member E, and the black triangles are used to indicate computed values thereof. Since the method for measuring a demagnetizing factor is similar to that of Example 1, a detailed explanation thereof will be omitted here.

By focusing on a preset temperature at which a demagnetizing factor became 2%, the following fact is to be understood as is the case with Examples 1 and 2. An actual measured value of a temperature at which a demagnetizing factor of the base material became 2% was 100° C. and a computation result thereof was 92°, which had an error of −8° C. An actual measured value of a temperature at which a demagnetizing factor of the magnet M3 constituted of the diffused member E became 2% was 122° C. and a computation result thereof was 113° C., which had an error of −9° C. This shows that a demagnetization characteristic could be analyzed with a satisfactory degree of accuracy. Moreover, it is to be understood that heat resistance of demagnetization of the magnet M3 was also enhanced by Dy diffusion in Example 3.

Figure 33:
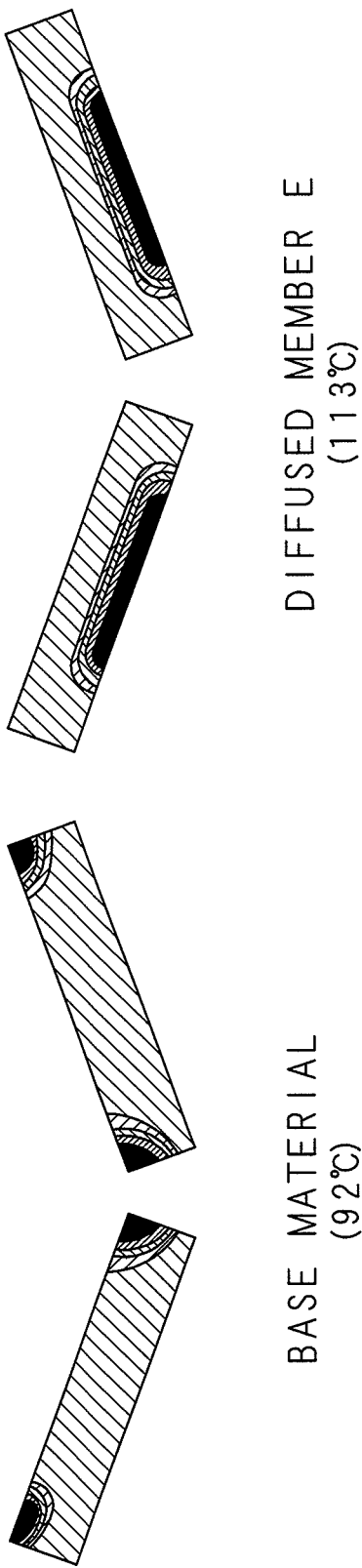
FIG. 33 is a schematic diagram for schematically illustrating a computation result of distribution of a Br decrease rate at a temperature at which the magnet of Example 3 having the ΔHcJ distribution illustrated in FIG. 31 is demagnetized by 2%.

FIG. 33 is a schematic diagram for schematically illustrating a computation result of distribution of a Br decrease rate at a temperature at which a magnet M3 of Example 3 having the ΔHcJ distribution illustrated in FIG. 31 is demagnetized by 2%. An example of the base material is illustrated on the left side of FIG. 33 and an example of the magnet M3, which is the diffused member E, is illustrated on the right side. Distribution is illustrated on a sectional view to be obtained by cutting away the magnet M3 along a plane perpendicular to the shaft of the IPM motor 5 as is the case with FIG. 31. As described above, computation shows that a demagnetizing factor of the base material became 2% at 92° C. Though a base material has uniform distribution of a coercivity, a demagnetizing factor has such distribution that the largest demagnetizing factor is obtained and the Br decrease rate is high at the outer corner parts of the IPM motor 5. It became clear from computation that a demagnetizing factor of the magnet M3, which is the diffused member E, becomes 2% at 113° C. Regarding the Br decrease rate at this time, a demagnetizing factor tends to be low at a location having a large coercivity increment illustrated in FIG. 32 and high at a location having a small coercivity increment. It is to be noted that measurement of a demagnetizing factor was also performed after heating the diffused member E to 113° C. and then returning the temperature to a room temperature (20° C.) in Example 3.

As illustrated in Examples 1 to 3, processing based on the magnetic force characteristic computing program 1 of the magnetic force characteristic computing device 1 according to the present embodiment 1 makes it possible to obtain a demagnetizing factor with a high degree of accuracy from a computation result of distribution of a coercivity increment ΔHcJ varying with location in an Nd—Fe—B series sintered magnet obtained by diffusing a heavy rare-earth element such as Dy.

As an embodiment and Examples 1 to 3, an example wherein Dy is used as a heavy rare-earth element has been explained. However, the present invention is not limited to this and can be applied widely to computation of a magnetic force characteristic of a magnet obtained by diffusing a heavy rare-earth element such as Tb.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A magnetic force characteristic computing method for obtaining a magnetic force characteristic in a magnet prepared by introducing a heavy rare-earth element from a surface of the magnet and diffusing the heavy rare-earth element into an outer periphery of a main face of the magnet or in a magnet prepared by diffusing a heavy rare-earth element into a magnet, comprising:

cutting at least one heavy rare-earth element diffused material into strips;
measuring heavy rare-earth element concentration in the strips and measuring coercivity HcJ of the strips;
preliminarily storing depth versus coercivity increment characteristic information describing distribution of the coercivity increment due to diffusion of the heavy rare-earth element versus depth from a surface of the material and an introduced heavy rare-earth element amount versus coercivity increment characteristic information describing a characteristic of the increment of the coercivity due to diffusion versus the introduced amount of the heavy rare-earth element;
processing depth versus introduced amount characteristic information describing the introduced amount distribution of the heavy rare-earth element versus depth, from the stored depth versus coercivity increment characteristic information and the stored introduced amount versus coercivity increment characteristic information;
receiving shape information on a dimension and a shape of the magnet;
receiving introduced face information on one or a plurality of faces of the magnet where the heavy rare-earth element has been introduced, in accordance with the received shape information;
computing for each face an introduced amount distribution in the magnet of the heavy rare-earth element introduced from the one or a plurality of faces based on the received shape information, the received introduced face information and the obtained depth versus introduced amount characteristic information;
obtaining introduced amount distribution of the entire magnet from introduced amount distribution obtained for each face; and
obtaining a distribution of a coercivity increment due to diffusion in the magnet based on the obtained introduced amount distribution in the entire magnet and the stored introduced amount versus coercivity increment characteristic information.

2. The magnetic force characteristic computing method according to claim 1,
wherein if the introduced amount distribution versus depth exceeds a threshold distance from a face of the magnet where a heavy rare-earth element is introduced to a rear face, the introduced amount distribution of the heavy rare-earth element versus depth is folded back at the threshold distance with the rear face functioning as a symmetry plane and the distribution being added repeatedly until no difference remains in the introduced amount distribution versus depth ratio.

3. The magnetic force characteristic computing method according to claim 1,
wherein a coercivity increment in the depth versus coercivity increment characteristic information or in the depth versus introduced amount characteristic information is expressed by an approximation formula of an exponential function of a depth.

4. The magnetic force characteristic computing method according to claim 1, further comprising:
preliminarily storing a magnetization curve before diffusion of a heavy rare-earth element and information of a temperature coefficient on a coercivity variation due to temperature change of the magnet versus different coercivities;

obtaining a magnetization curve at a first predetermined temperature at each location of the magnet, based on the obtained stored magnetization curve and the distribution of a coercivity increment;

computing a magnetization curve at a second predetermined temperature, based on the obtained magnetization curve and the stored information of a temperature coefficient; and computing a demagnetizing factor at the first predetermined temperature after different demagnetizing fields are applied to respective locations at the second temperature causing demagnetization, based on the computed magnetization curve.

5. The magnetic force characteristic computing method according to claim 4, further comprising:

obtaining a demagnetization characteristic at different temperatures of the magnet, based on the obtained distribution of a coercivity increment; and specifying a demagnetization temperature at which a demagnetizing factor of the magnet becomes equal to or lower than a predetermined value.

6. A magnetic force characteristic computing method, comprising:

cutting at least one Dysprosium diffused material into strips;

measuring Dysprosium concentration in the strips and measuring coercivity HcJ of the strips;

generating a screen for receiving input or selection of shape information of a magnet and information on which face of the magnet Dysprosium is to be introduced to and outputting to the screen via an interface, by an operation unit of a magnetic force characteristic computing device;

receiving input of shape information of the magnet and selection of a Dysprosium introduction face using a keyboard and a mouse via the interface, by the operation unit;

reading out from a depth δ/ΔHcJ database on distribution of a coercivity increment ΔHcJ versus depth δ from a Dysprosium introduction face and a Dysprosium (Dy) introduction amount/ΔHcJ database stored in a storage unit, by the operation unit;

computing depth δ/Dy introduction amount information on a correspondence between a depth δ and a Dysprosium introduction amount, by the operation unit;

selecting one introduction face based on the shape information and the information of the received Dysprosium introduction face and specifying a thickness D from the selected introduction face to a rear face which is the limitation of a depth δ for the selected introduction face, by the operation unit;

computing distribution of the Dysprosium introduction amount up to the specified thickness D based on the computed depth δ/Dy introduction amount information in view of a Neumann boundary condition, by the operation unit;

determining whether all introduction faces are selected and each distribution of the Dysprosium introduction amount is computed or not, by the operation unit;

if determined that distribution of the Dysprosium introduction amount regarding all introduction faces is computed, summing up distributions of the Dysprosium introduction amount regarding all introduction faces so as to compute a distribution of a Dysprosium introduction amount in the magnet, by the operation unit; and converting the computed distribution of the Dysprosium introduction amount in the magnet into a coercivity increment ΔHcJ distribution in the magnet, based on the Dysprosium introduction amount/ΔHcJ database, by the operation unit, and saving the distribution to a memory.

7. The magnetic force characteristic computing method according to claim 6, wherein if the introduced amount distribution versus depth exceeds a threshold distance from a face of the magnet where a heavy rare-earth element is introduced to a rear face, the introduced amount distribution of the heavy rare-earth element versus depth is folded back at the threshold distance with the rear face functioning as a symmetry plane and the distribution being added repeatedly until no difference remains in the introduced amount distribution versus depth ratio.

8. The magnetic force characteristic computing method according to claim 6, wherein the coercivity increment ΔHcJ in the depth δ/coercivity increment ΔHcJ information or in the depth δ versus Dysprosium introduction amount information is expressed by an approximation formula of an exponential function of a depth δ.

9. The magnetic force characteristic computing method according to claim 6, further comprising:

computing coercivity HcJ distribution after Dysprosium diffusion at an ordinary temperature, based on a magnet characteristic of the obtained magnet before diffusion and the obtained coercivity increment ΔHcJ, by the operation unit;

computing a demagnetization curve of a first case where the temperature of the magnet rises to a demagnetization evaluation temperature as a magnetic force characteristic, based on the computed coercivity HcJ distribution in view of a different temperature coefficient, by the operation unit;

computing a demagnetization curve of a second case where a load including an application of a demagnetizing field is first applied in a state where the temperature of the magnet rises to the demagnetization evaluation temperature causing demagnetization and then the temperature is returned to an ordinary temperature, based on a stored temperature coefficient, by the operation unit; and computing and displaying a demagnetizing factor at the demagnetization evaluation temperature based on the computed demagnetization curve of the first case and the computed demagnetization curve of the second case, by the operation unit.

10. A magnetic force characteristic computing device for obtaining a magnetic force characteristic in a magnet prepared by introducing a heavy rare-earth element onto a surface of the magnet and diffusing the heavy rare-earth element into an outer periphery of the main face of the magnet or in a magnet prepared by diffusing the heavy rare-earth element into the magnet, comprising:

a cutting unit that cuts at least one heavy rare-earth diffused material into strips;

a measuring unit that measures heavy rare-earth concentration in the strips and measures coercivity HcJ of the strips;

a first storage unit for preliminarily storing depth versus coercivity increment characteristic information on distribution of an increment of coercivity due to diffusion of the heavy rare-earth element versus depth from a surface of the material and introduced amount versus coercivity increment characteristic information describing a characteristic of an increment of a coercivity due to diffusion versus an introduced amount of the heavy rare-earth element;

a depth versus introduced amount characteristic information obtaining unit for obtaining depth versus introduced amount characteristic information a describing introduced amount distribution of a heavy rare-earth element versus depth, from the stored depth versus coercivity increment characteristic information and the stored introduction amount versus coercivity increment characteristic information;

a first receiving unit that receives shape information on a dimension and a shape of the magnet;

a second receiving unit that receives introduction face information on one or a plurality of faces where the heavy rare-earth element has been introduced, in accordance with the shape information;

an introduction amount distribution computation unit for computing for each face an introduced amount distribution in the magnet of the heavy rare-earth element introduced from the one or a plurality of faces based on the received shape information, the received introduction face information and the obtained depth versus introduced amount characteristic information;

an introduced amount distribution obtaining unit for obtaining an introduced amount distribution of the entire magnet from the introduced amount distribution obtained for each face; and a coercivity increment distribution computation unit for computing distribution of a coercivity increment due to diffusion in the magnet, based on the obtained introduced amount distribution in the entire magnet and the stored introduced amount versus coercivity increment characteristic information.

11. The magnetic force characteristic computing device according to claim 10, further comprising:

a second storage unit for preliminarily storing a magnetization curve before diffusion of the heavy rare-earth element and information of a temperature coefficient on a coercivity variation due to temperature change of the other magnet versus different coercivities;

a magnetization curve obtaining unit for obtaining a magnetization curve at a first predetermined temperature of the magnet, based on a stored magnetization curve and the obtained distribution of a coercivity increment in the magnet;

a magnetization curve computation unit for computing a magnetization curve at a second predetermined temperature, based on the obtained magnetization curve and the stored information of a temperature coefficient; and a demagnetizing factor computation unit for computing a demagnetizing factor at the first predetermined temperature after different demagnetizing fields are applied to respective locations at the second temperature causing demagnetization, based on the computed magnetization curve.

12. A magnetic force characteristic computing device comprising:

means for cutting at least one Dysprosium diffused material into strips;

means for measuring Dysprosium concentration in the strips and measuring coercivity HcJ of the strips; and an operation unit, wherein the operation unit includes:

means for generating a screen for receiving input or selection of shape information of a magnet and information on which face of the magnet Dysprosium is to be introduced to and outputting the screen via an interface to a display;

means for receiving input of shape information of the magnet and selection of a Dysprosium introduction face using a keyboard and a mouse via the interface;

means for reading out a depth $\delta/\Delta HcJ$ database on distribution of a coercivity increment $\Delta HcJ$ versus depth $\delta$ from the Dysprosium introduction face and a Dysprosium (Dy) introduction amount/$\Delta HcJ$ database stored in a storage unit;

means for computing depth $\delta$/Dy introduction amount information on a correspondence between a depth $\delta$ and a Dysprosium introduction amount;

means for selecting one introduction face based on the received shape information and the received information of the Dysprosium introduction face and specifying a thickness D from the selected introduction face to a rear face as a threshold of a depth $\delta$ for the selected introduction face;

means for computing a distribution of the Dysprosium introduction amount up to the specified thickness D based on the computed depth $\delta$/Dy introduction amount information in view of a Neumann boundary condition;

means for determining whether all introduction faces are selected and whether each distribution of the Dysprosium introduction amount is computed or not;

means for, when determining that the distribution of the Dy introduction amount regarding all introduction faces is computed, summing up distributions of the Dy introduction amount regarding all introduction faces so as to compute a distribution of the Dy introduction amount in the magnet; and means for converting the computed the distribution of the Dy introduction amount in the magnet into coercivity increment $\Delta HcJ$ distribution in the magnet, based on the Dy introduction amount/$\Delta HcJ$ database.

13. The magnetic force characteristic computing device according to claim 12, wherein the operation unit further includes:

means for computing coercivity HcJ distribution after Dysprosium diffusion at an ordinary temperature, based on a magnet characteristic of the magnet before diffusion and the obtained coercivity increment $\Delta HcJ$;

first computing means for computing a demagnetization curve of a first case where the temperature of the magnet rises to a demagnetization evaluation temperature as a magnetic force characteristic, based on the computed coercivity HcJ distribution in view of a different temperature coefficient;

second computing means for computing a demagnetization curve of a second case where a load including an application of a demagnetizing field is first applied in a state where the temperature of the magnet rises to the demagnetization evaluation temperature causing demagnetization and then the temperature is returned to an ordinary temperature, based on a stored temperature coefficient; and means for computing a demagnetizing factor at the demagnetization evaluation temperature based on the computation results of the first and second computing means.

14. A non-transitory computer-readable recording medium, in which is recorded a computer program for causing a computer provided with a storage unit to compute a magnetic force characteristic in a magnet prepared by introducing a heavy rare-earth element from a surface of the magnet and diffusing the heavy rare-earth element into an outer periphery of the main face of the magnet or in a magnet prepared by diffusing a heavy rare-earth element into the magnet, using depth versus coercivity increment characteristic information describing distribution of an increment of a coercivity due to diffusion of a heavy rare-earth element versus depth from a surface of another magnet and introduced amount versus coercivity increment characteristic information describing a characteristic of an increment of a coercivity due to diffusion versus introduction amount of the heavy rare-earth element stored in the storage unit,
preliminarily measuring heavy rare-earth concentration in strips of at least one material and measuring coercivity HcJ of the strips of the material,
the computer program causing the computer to execute:
obtaining depth versus introduced amount characteristic information describing introduction amount distribution of the heavy rare-earth element versus depth, from stored depth versus coercivity increment characteristic information and stored introduced amount versus depth increment characteristic information;
receiving shape information on a dimension and a shape of the magnet;
receiving introduction face information on one or a plurality of faces where the heavy rare-earth element has been introduced, in accordance with the shape information;
computing for each face an introduced amount distribution in the magnet of the heavy rare-earth element introduced from the one or a plurality of faces, based on the received shape information, the received introduction face information and the obtained depth versus introduced amount characteristic information;
computing introduced amount distribution in the entire magnet from the introduced amount distribution obtained for each face; and
obtaining a distribution of a coercivity increment due to diffusion in the magnet, based on the computed introduced amount distribution in the entire magnet and the stored introduced amount versus coercivity increment characteristic information, and outputting the distribution to the storage unit and a display of the computer.

15. The recording medium according to claim 14, wherein a storage unit storing a magnetization curve before diffusion of a heavy rare-earth element and information of a temperature coefficient on a coercivity variation due to temperature change of a magnet versus different coercivities is further used, and
the computer program further causes the computer to execute:
obtaining a magnetization curve at a first predetermined temperature of the magnet, based on the stored magnetization curve and the obtained distribution of a coercivity increment;
computing a magnetization curve at a second predetermined temperature, based on the obtained magnetization curve and the stored information of a temperature coefficient; and
computing a demagnetizing factor at the first predetermined temperature after different demagnetizing fields are applied to respective locations at the second temperature causing demagnetization, based on the computed magnetization curve.

16. A non-transitory computer-readable recording medium, in which is recorded a computer program for causing a computer provided with a storage unit to compute a magnetic force characteristic in a magnet prepared by introducing a heavy rare-earth element from a surface of a magnet and diffusing the heavy rare-earth element into an outer periphery of the main face of the magnet or in a magnet prepared by diffusing the heavy rare-earth element into inside of the magnet, using depth versus coercivity increment characteristic information describing distribution of an increment of a coercivity due to diffusion of the heavy rare-earth element versus depth from a surface of another magnet and introduced amount versus coercivity increment characteristic information describing a characteristic of an increment of a coercivity due to diffusion versus an introduced amount of the heavy rare-earth element stored in the storage unit,
preliminarily measuring Dysprosium concentration in strips of at least one material and measuring coercivity HcJ of the strips of the material,
the computer program causing the computer to execute:
creating a screen for receiving input or selection of shape information of the magnet and information on which face of a magnet Dysprosium is to be introduced from and outputting the screen via an interface to a display;
receiving input of shape information of the magnet and selection of a Dysprosium introduction face using a keyboard and a mouse via the interface;
reading out a depth $\delta/\Delta HcJ$ database on distribution of a coercivity increment $\Delta HcJ$ versus depth $\delta$ from a Dysprosium introduction face and a Dysprosium (Dy) introduction amount/$\Delta HcJ$ database stored in the storage unit;
computing depth $\delta$/Dy introduction amount information on a correspondence between a depth $\delta$ and the Dysprosium introduction amount;
selecting one introduction face based on the shape information and the information of the received Dysprosium introduction face and specifying a thickness D from the selected introduction face to a rear face as a threshold of a depth $\delta$ for the selected introduction face;
computing distribution of the Dysprosium introduction amount up to the specified thickness D based on the computed depth $\delta$/Dy introduction amount information in view of a Neumann boundary condition;
determining whether all introduction faces are selected and whether each distribution of the Dysprosium introduction amount is computed or not;
if determined that each distribution of the Dy introduction amount regarding all introduction faces is computed, summing up the distributions of the Dysprosium introduction amount regarding all introduction faces so as to compute a distribution of the Dysprosium introduction amount in the entire magnet; and
converting the distribution of the computed Dysprosium introduction amount in the entire magnet into a coercivity increment $\Delta HcJ$ distribution in the magnet, based on the Dysprosium introduction amount/$\Delta HcJ$ database.

17. The recording medium according to claim 16, wherein the storage unit storing a magnetization curve before diffusion of the heavy rare-earth element and information of a temperature coefficient on a coercivity variation due to temperature change of the other magnet against different coercivities is further used, and
the computer program further causes the computer to execute:
computing coercivity HcJ distribution after Dysprosium diffusion at an ordinary temperature, based on a magnet characteristic of the magnet before diffusion and the coercivity increment $\Delta HcJ$ obtained in the step S9;
computing a demagnetization curve of a first case where the temperature of the magnet rises to a demagnetization evaluation temperature as a magnetic force characteristic, based on the computed coercivity HcJ distribution in view of a different temperature coefficient;
computing a demagnetization curve of a second case where a load including an application of a demagnetizing field is first applied in a state where the temperature of the magnet rises to the demagnetization evaluation temperature causing demagnetization and then the temperature is returned to an ordinary temperature, based on a stored temperature coefficient;

computing a demagnetizing factor at the demagnetization evaluation temperature based on the demagnetization curve of the first case and the demagnetization curve of the second case; and displaying the computed demagnetization factor on the screen.

* * * * *